US006493636B1

United States Patent
DeKok

(10) Patent No.: US 6,493,636 B1
(45) Date of Patent: Dec. 10, 2002

(54) METHOD OF MARINE SEISMIC EXPLORATION UTILIZING VERTICALLY AND HORIZONTALLY OFFSET STREAMERS

(75) Inventor: Robbert J. DeKok, River Ridge, LA (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/401,590

(22) Filed: Sep. 22, 1999

Related U.S. Application Data

(60) Provisional application No. 60/107,179, filed on Nov. 5, 1998.

(51) Int. Cl.[7] ................................................ G01V 1/28
(52) U.S. Cl. ............................ 702/17; 367/20; 367/24
(58) Field of Search ............................. 367/73, 19, 20, 367/21, 23, 24, 56, 57, 58, 141, 153, 154; 702/17

(56) References Cited

U.S. PATENT DOCUMENTS

| | | | | |
|---|---|---|---|---|
| RE32,683 E | * | 5/1988 | Ray | 367/23 |
| 5,148,406 A | * | 9/1992 | Brink et al. | 367/20 |
| 5,517,463 A | * | 5/1996 | Hornbostel et al. | 367/13 |
| 5,586,026 A | * | 12/1996 | Highnam et al. | 364/421 |
| 5,696,734 A | * | 12/1997 | Corrigan | 367/24 |
| 5,729,506 A | * | 3/1998 | Dragoset, Jr. et al. | 367/24 |

FOREIGN PATENT DOCUMENTS

WO    WO 96/18117    * 6/1996

* cited by examiner

*Primary Examiner*—Edward Lefkowitz
*Assistant Examiner*—Anthony Gutierrez

(57) ABSTRACT

A method and apparatus for acquiring high resolution 3D marine seismic data using at least two seismic streamers which are generally parallel to one another longitudinally, and offset from one another in both the vertical and horizontal plane. In one embodiment, the acquisition method uses a vertically staggered source array which is operated using end-fire principles as described below. A processing method is applied for reducing the effect of receiver signal ghosts on the processed signal, thereby allowing the seismic array to be towed deeper without reducing the effective bandwidth of the processed seismic signals. In another embodiment, a vertically staggered source array is utilized. Such that the array provides for the removal of source signal ghosts from the processed seismic and thereby complement the quasi-over under receiver array to synergistically provide for removal of all signal ghosts.

12 Claims, 25 Drawing Sheets

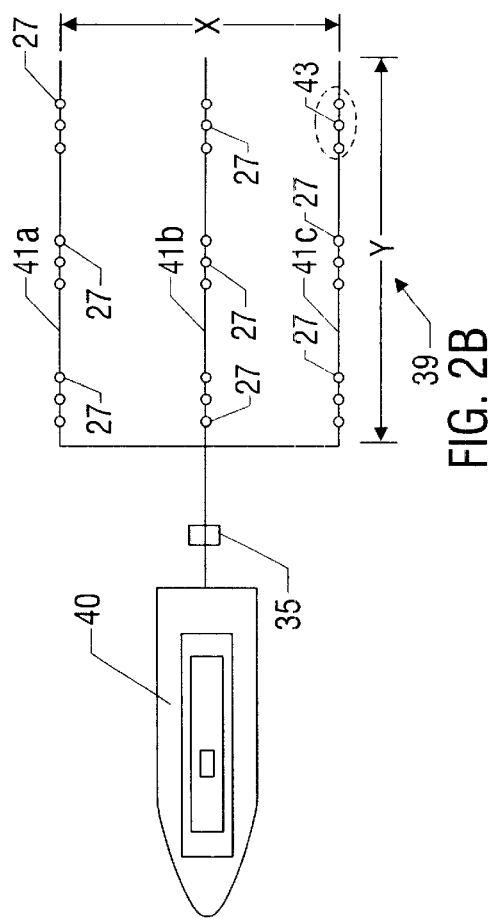
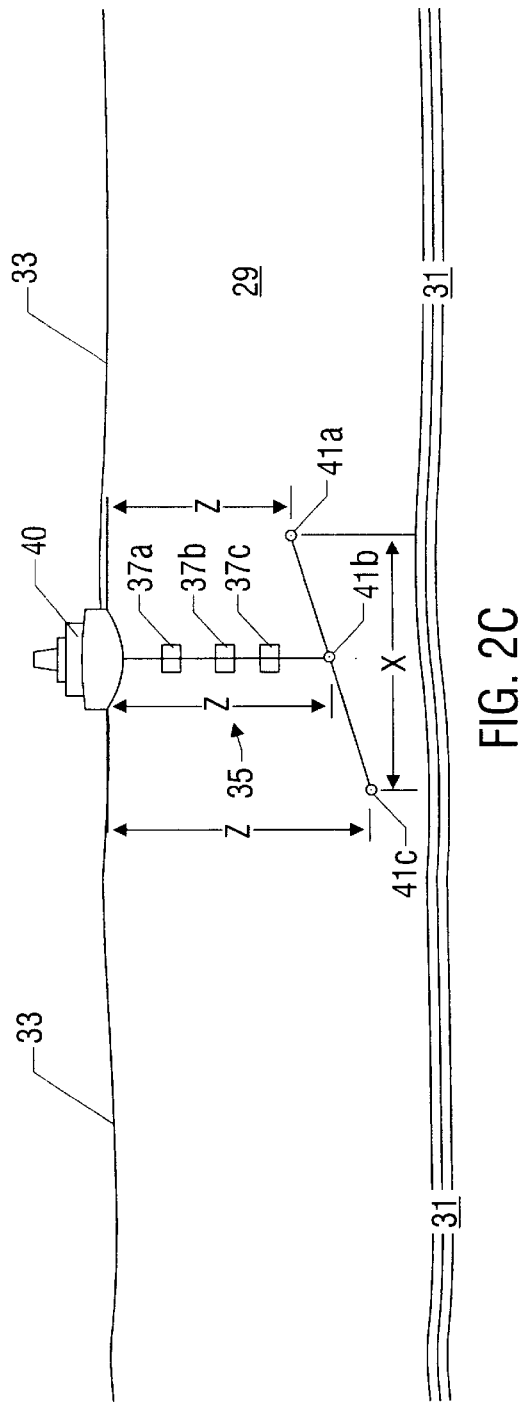

METHOD OF MARINE SEISMIC EXPLORATION UTILIZING VERTICALLY AND HORIZONTALLY OFFSET STREAMERS

RELATED APPLICATION

This application claims the priority of prior provisional application serial No. 60/107,179 filed on Nov. 5, 1998.

FIELD OF THE INVENTION

This invention relates to a method for acquiring and processing three-dimensional ("3D") marine seismic data.

BACKGROUND OF THE INVENTION

Exploration for hydrocarbons under offshore waters is becoming increasingly important. The prospective hydrocarbon reservoir structures that need to be detected are becoming smaller and are more difficult to image on seismic sections and their commercial value is more difficult to establish with standard seismic data quality. The need to mitigate these difficulties translates into a requirement for higher resolving power of the seismic data.

Further, the depth of the waters where the search is conducted is continually growing deeper. As the water depths grow deeper, the costs and risks associated with exploring for and producing the hydrocarbons increases.

Also, new techniques such as directional drilling have allowed several reservoirs to be produced from a single platform. This significantly reduces the costs associated with recovering the hydrocarbons and allows maximum usage of the installed facilities. To effectively drill and complete directional wells into several reservoirs and to optimally produce hydrocarbons from the reservoirs, it is desirable to have as much information as possible about reservoirs and the sediments that overlie the reservoirs. It is desirable to be able to cheaply and effectively collect and process higher resolution seismic data than is typically acquired today. For these drilling and production requirements it is also desirable to increase both the lateral and the vertical resolution of processed seismic data.

Currently, the most common system used to acquire marine three dimensional (3D) seismic data is shown in FIG. 1. A conventional acquisition system 21 utilizes one or more seismic sources 23, such as air guns or waterguns, which radiate sonic energy into the water. These conventional arrays also utilize a group of streamers 25 that are laterally separated from one another, but lie in approximately the same horizontal plane. Located at regular intervals along the length of each streamer are hydrophones 27. Normally, seismic source 23 is fired while source 23 and streamers 25 are being towed through water 29. The sound energy that is produced from source 23 travels downward through water 29 and underlying strata 31. Hydrophones 27 located on streamers 25 collect the seismic signal that is reflected from strata 31 and travels back through water 29 to hydrophones 27. The collected seismic signal is recorded and processed by methods known to the industry.

In general, the vertical resolution of processed seismic data is proportional to the effective bandwidth of the processed seismic signal. Streamer noise can be a major factor in limiting the effective bandwidth of the processed seismic signal. Typically, streamers 25 are towed deeper below the sea surface 33 to minimize the noise and thereby maximize the effective bandwidth of the processed signal. However, as the depth at which streamers 25 are towed increases, the adverse effect of Receiver Signal Ghosts (as hereinafter described) on the processed signal increases. For conventional seismic acquisition and processing, the Receiver Signal Ghosts cause deep notches in the wavelet spectrum of the recorded seismic signal. In practice, no sound energy is typically usable at frequencies greater than the first notch ("ghost notch"). The approximate frequency where the first notch occurs can be determined by Equation 1 below:

$$f_N = V_W/2D \qquad \text{Eq. (1)}$$

Where, $f_N$=Notch frequency
$V_W$=Propagation velocity of sound wave in water
$D$=Depth of the detector This frequency ($f_N$) is approximate because an assumption is made that the sound waves are plane waves propagating vertically in the water. Due to the fact that the velocity of sound in water is much lower than the velocity of sound under the seabed, Eq.(1) is generally a good approximation.

As can be seen from Eq.(1), the first notch moves lower in frequency as the streamers are towed deeper, thereby, reducing the effective bandwidth of the processed seismic signal. Therefore, in conventional 3D marine seismic acquisition, the streamers tend to be towed deeper to minimize streamer noise, but this tends to reduce the effective bandwidth of the processed signal and thereby reduces the vertical resolution of the processed seismic signal.

Seismic acquisition techniques have been developed which use "vertical arrays" in which the hydrophones are vertically offset from one another, but generally lie in the same plane. For example, U.S. Pat. No. 3,952,281 discloses a method for collecting seismic data from a towed vertical hydrophone array that uses one or more towed seismic streamers that are spaced apart vertically. U.S. Pat. No. 3,952,281 does not disclose a method for collecting 3D marine seismic data using streamers separated both vertically and horizontally.

Techniques have been developed in an attempt to reduce the effect of ghost signals on processed seismic data. For example, U.S. Pat. No. 4,992,992 discloses a method for collecting seismic data from a towed vertical hydrophone array that uses a towed seismic streamer having a slanted orientation in the water. The patent also discloses a method for processing the seismic data to reduce the effect of ghost signals on the processed seismic signal. U.S. Pat. No. 4,992,992 discloses that the recorded data is processed to align the primary signals, thereby misaligning the ghost signals. The patent also discloses that the data is also preferably processed to align the ghost signals, thereby misaligning the primary signals. The patent further discloses that the two resulting data sets may be combined. Unfortunately, it is very difficult to maintain a streamer in a straight slanted orientation while it is being towed through the water. The devices necessary to maintain the streamer in a slanted orientation are difficult to operate and create a large amount of noise that can reduce the quality of the processed seismic signal. This can result in seismic surveys that are expensive to acquire and difficult to process effectively.

U.S. Pat. No. 4,992,991 discloses a method for acquiring marine seismic data that utilizes at least three seismic cables that are towed parallel to the surface of the sea and are located at two different depths. Each of the cables has a plurality of hydrophones spaced along its respective length. The patent discloses that the arrangement of the hydrophones in the seismic array allows the directionality of the wavelets entering the network of cable to be determined and that one advantage of the array is that the actual separation distances of the cables within the network of cables can be controlled for maximum wavelet direction identification. However, the patent does not disclose configuring such a network of cables to acquire high density 3D seismic data. Further, the patent does not disclose any particular methods to use for processing the seismic data acquired and does not disclose any method of processing the acquired seismic data to reduce the effects of Receiver Signal Ghosts on the processed seismic.

For a 3D marine seismic survey, the achievable lateral resolution of the processed seismic is proportional to the areal density of the seismic data acquired. It is generally cheaper and therefore more desirable to acquire high density seismic data using a large number of closely spaced streamers in a single pass seismic acquisition layout, than to acquire that data by making several overlapped passes using a boat towing streamers that are not as closely spaced. However, for a conventional marine 3D seismic acquisition, minimum streamer proximity becomes a key obstacle in shooting high density surveys. Typically, a minimum lateral spacing of at least fifty meters (50 m) between adjacent streamers is desirable to avoid collision or entanglement of the streamers. In general, for a single source seismic design, the minimum achievable subsurface line spacing is about half the minimum streamer proximity. Therefore, in conventional marine 3D seismic acquisition, the minimum achievable subsurface line spacing for a single pass seismic acquisition design is typically about twenty five meters (25 m). In many situations, it is desirable to acquire seismic data that has a subsurface line spacing on the order of twelve and a half meters (12.5 m) or less. However, due to cost constraints and/or situations of timesharing of seismic acquisition boats, it is unacceptable or impracticable to acquire the seismic using multi-pass seismic survey designs.

What is desired is a seismic acquisition method that in a cost effective manner provides seismic data, that can be processed to provide both increased vertical resolution and increased lateral resolution over conventional seismic acquisition methods. Also, what is desired is an acquisition method that improves the efficiency of acquiring 3D marine seismic data by allowing continued acquisition in deteriorating sea states. What is further desired is a method for processing marine 3D seismic data that reduces the effects of Source Signal Ghosts (as hereinafter described) and Receiver Signal Ghosts on processed seismic data.

As used herein, the following terms shall have the following meanings:

(a) "offset" is the horizontal distance from the source-position (or from the center of a source group) to a seismic detector, or more commonly to the center of a detector group measured in the horizontal (x-y) plane. For a vertically staggered source array, the source-position is assumed to be located at a point in the x-y plane directly above the center-point of the stacked elements;

(b) "in-line" refers to a line whose axis lies in the horizontal (x-y) plane and lies parallel to the direction in which the 3D seismic data was acquired;

(c) "cross-line" refers to the direction in the horizontal (x-y) plane which is perpendicular or nearly perpendicular to the direction in which the 3D seismic data was acquired;

(d) "subsurface line spacing" refers to the distance between adjacent subsurface seismic lines, measured in the cross-line direction;

(e) "subsurface seismic lines" refer to lines of source-receiver midpoints, when the source-receiver midpoints are projected onto a common x-y plane. The subsurface seismic lines in general lie in the in-line direction;

(f) "midpoint(s)" are the notional points that are located halfway between source and receiver;

(g) "vertically staggered source array" refers to individual source elements or groups of individual source elements that are positioned so that an element is located at a different vertical location than another element;

(h) "k" refers to the spatial wavenumber, or the inverse of the wavelength;

(i) "areal" shall mean "pertaining to an area" and refers more specifically in this application to measurements that lie in the x-y plane;

(j) "primary signal" and "direct sound energy" refers to that portion of the sound energy that propagates to and from the strata and through the water, without being reflected off the sea surface. An example of a primary signal would be the signal that results from the sound energy traveling ray path F, as depicted in FIG. 4A;

(k) "Signal Ghost" refers to a delayed negative representation of the primary signal and is caused by reflection of the sound energy at the sea surface;

(l) "Source Signal Ghost" refers to a Signal Ghost which results from the reflection at the sea surface of the source sound energy near the seismic source, as depicted by ray path D in FIG. 4B. For a Source Signal Ghost, the source sound energy reflects off the sea surface before it travels to the strata;

(m) "Receiver Signal Ghost" refers to a Signal Ghost which results from the reflection at the sea surface, near the receiver, of the sound energy emerging from the strata, as depicted by raypath E in FIG. 4C;

(n) "Source-Receiver Pair" refers to a source at a specific position being recorded in a receiver located in a particular position relative to said source. A seismic recording, or trace, is uniquely defined by the description of the corresponding source receiver pair;

(o) "Characteristic Wavelength" refers to the wavelength of the fundamental frequency of a pattern, or cycle, that repeats itself across a seismic survey. It should be noted that for a given seismic acquisition design there may be more than one Characteristic Wavelength. The Characteristic Wavelength is measured in feet, meters, or some other unit of length;

(p) "DMO" refers to a process that creates apparent common reflection-point gathers by a convolution applied to adjacent common-midpoint gathers, with the feature that the normal moveout for reflectors from a dipping bed no longer depends on the dip angle.

(q) "Wiener filter" refers to a causal filter which will transform an input into a desired output as nearly as possible, subject to certain constraints. "As nearly as possible" (in a least-squares sense) implies that the sum of the squares of differences between the filter output and the desired result is minimized.

SUMMARY OF THE INVENTION

The invention provides a method for acquiring high resolution 3D marine seismic data using at least two seismic streamers which are generally parallel to one another longitudinally, and offset from one another in both the vertical and horizontal plane. Preferably, the acquisition method uses a vertically staggered source array which is operated using end-fire principles as described below.

The present invention also provides a processing method for reducing the effect of Receiver Signal Ghosts on the processed signal, thereby allowing the seismic array to be towed deeper without reducing the effective bandwidth of the processed seismic signals. Towing the seismic array deeper will greatly reduce the noise. This will lead to methods for acquiring and processing 3D marine seismic having higher vertical resolution, than conventional seismic acquisition and processing methods.

The processing method of the present invention also reduces any unwanted effects stemming from the cyclic signal variations when viewed in the cross-line direction, that result from the acquisition method of the invention.

The present invention allows the seismic acquisition streamers to be towed laterally closer together than would be practicable using conventional acquisition techniques. The invention thereby allows the minimum achievable subsurface line spacing to be reduced and increases the achievable horizontal resolution. This also increases the number of subsurface seismic lines that can be acquired in a single pass acquisition survey, thereby reducing the cost and complexity of acquiring high-density seismic data. It is believed that the current invention will be much more economical than the alternative of acquiring high-density seismic data by an interleaved seismic acquisition design.

In some aspects, a vertically staggered source array is preferably utilized. The use of a vertically staggered source array will provide for the removal of Source Signal Ghosts from the processed seismic and thereby complement the quasi over-under receiver array to synergistically provide for removal of all Signal Ghosts.

BRIEF DESCRIPTION OF THE DRAWINGS

The foregoing and other features and advantages of the present invention will be best understood with reference to the following detailed description of a specific embodiment of the invention, when read in conjunction with the accompanying drawings, wherein:

FIG. 2B is a schematic side view depiction of one embodiment of the 3D seismic acquisition system of the current invention.

FIG. 2C is a schematic rear view depiction of one embodiment of the 3D seismic acquisition system of the current invention.

DETAILED DESCRIPTION OF SPECIFIC EMBODIMENTS OF THE INVENTION

In the disclosure that follows, in the interest of clarity, not all features of actual implementations are described. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the field of geophysical exploration.

While this invention is susceptible of embodiment in many different forms, there are shown in the figures, and will be described in detail herein, specific embodiments of the invention. It should be understood, however, that the present disclosure is to be considered as an exemplification of the principles of the invention and is not intended to limit the invention to the specific embodiments illustrated.

Seismic Source

Figure 1A:
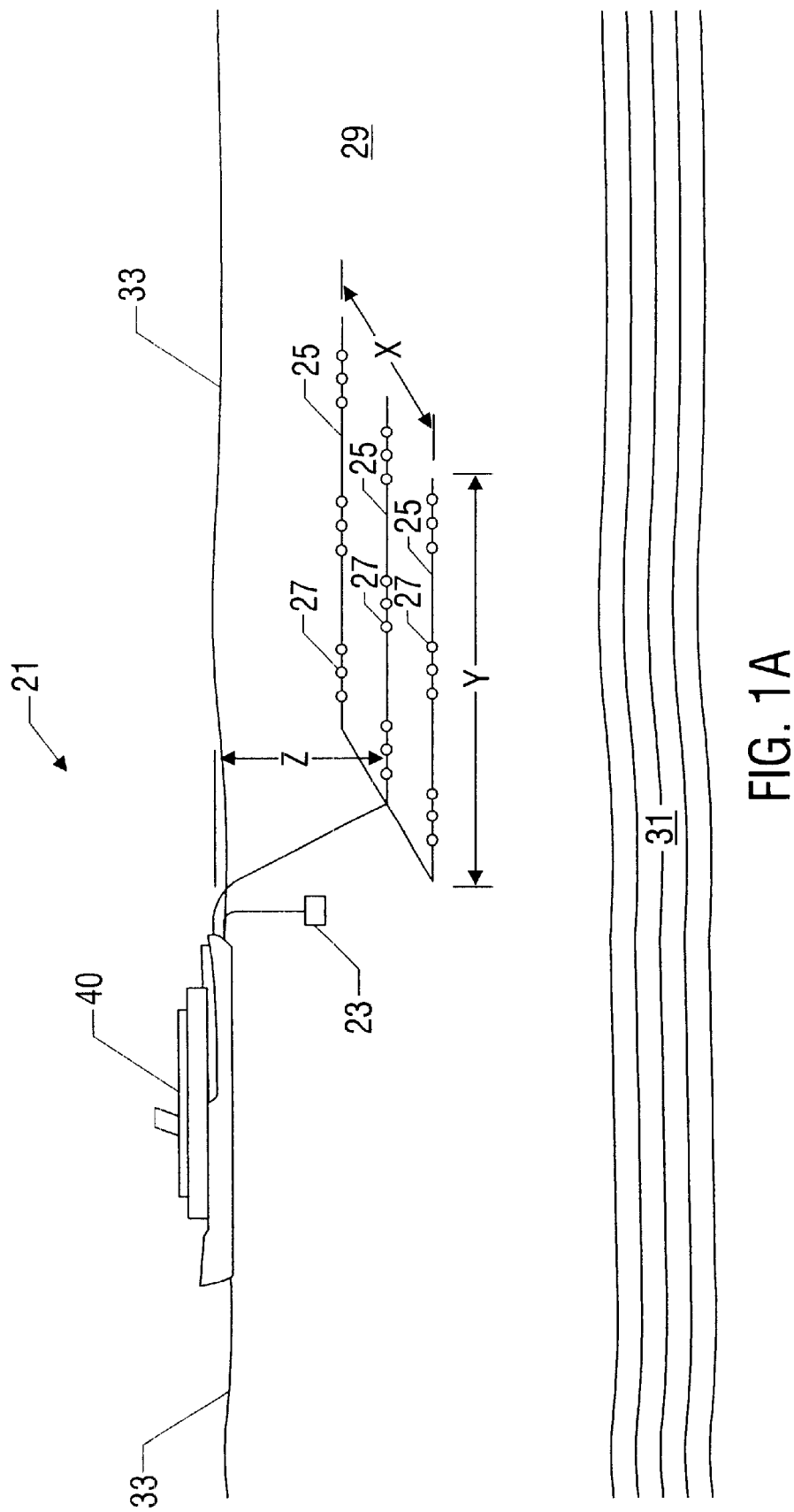
FIG. 1A is a schematic side view depiction of a conventional marine 3D seismic acquisition system.
Figure 1B:
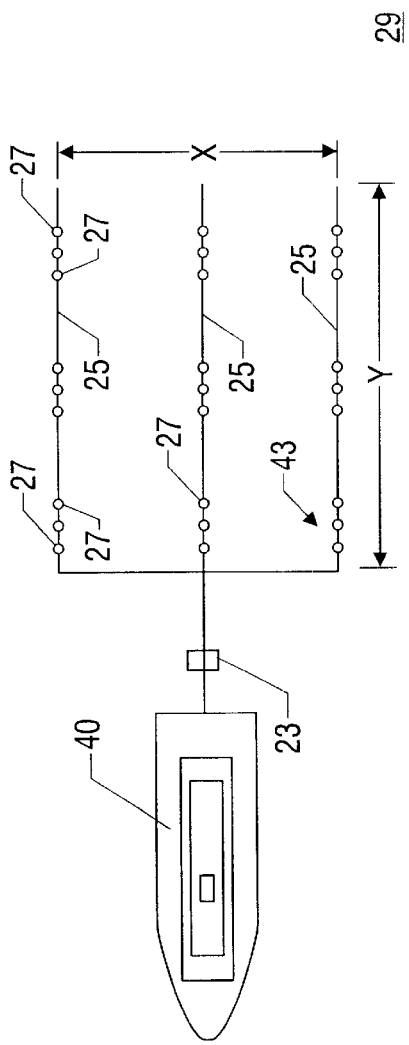
FIG. 1B is a schematic top view depiction of a conventional marine 3D seismic acquisition system.
Figure 1C:
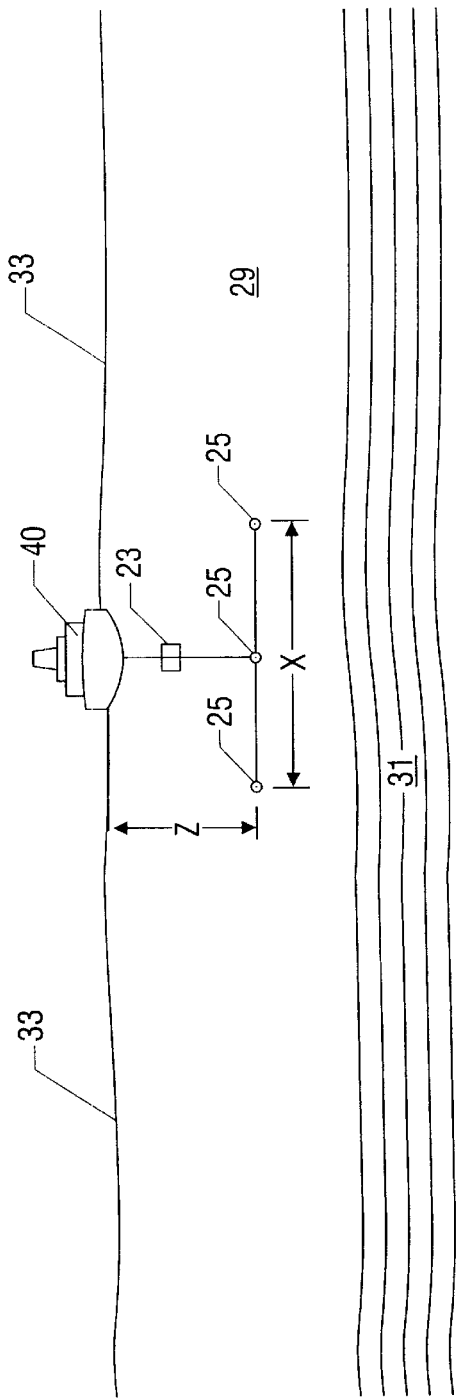
FIG. 1C is a schematic rear view depiction of a conventional marine 3D seismic acquisition system.
Figure 2A:
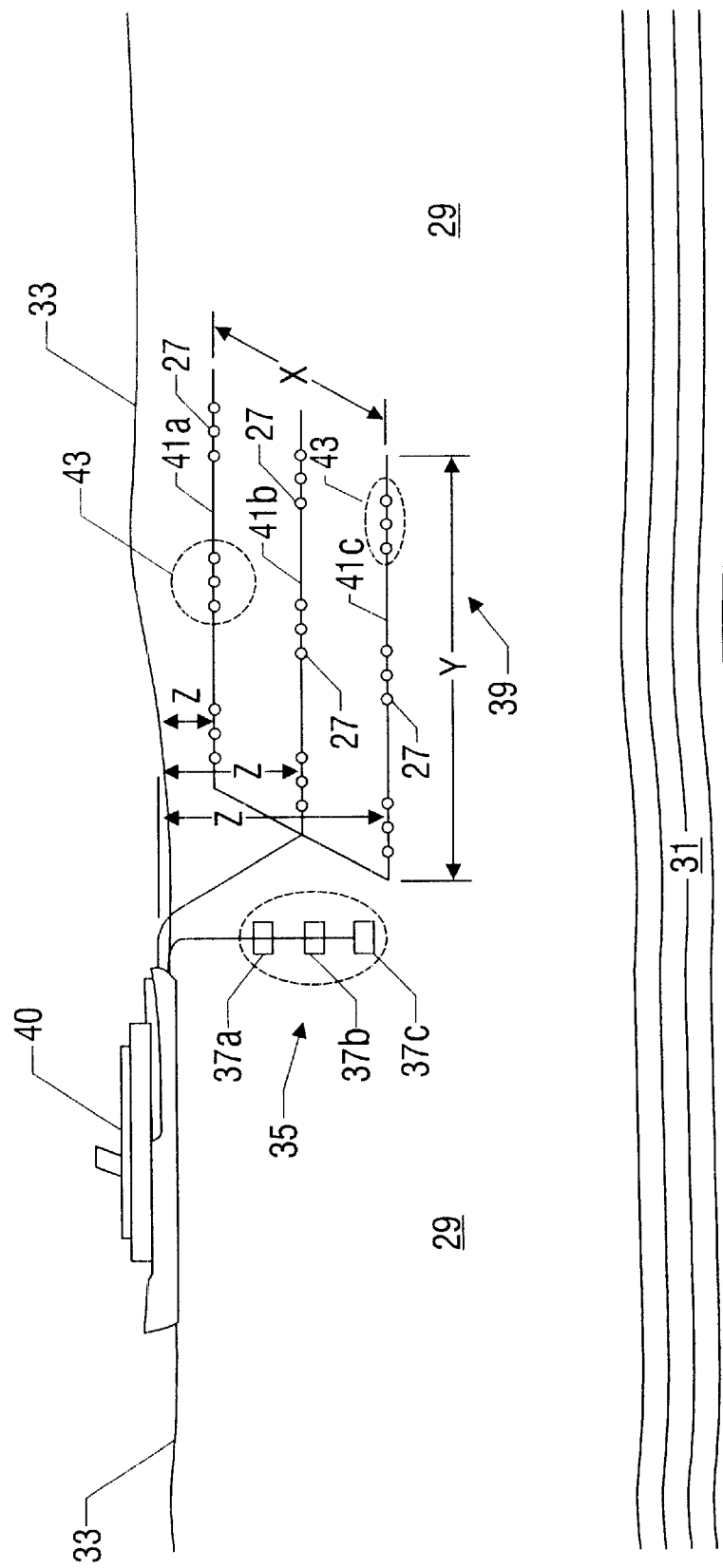
FIG. 2A is a schematic top view depiction of one embodiment of the 3D seismic acquisition system of the current invention.

Any seismic source typically used in marine seismic acquisition can be used with the present invention. Preferably, a vertically staggered source array 35, as shown in FIGS. 2A, 2B, and 2C, is used with the present invention. Array 35 is comprised of several individual source elements 37*a*, *b*, and *c* that are vertically stacked on top of one another. Vertically staggered source array 35 is operated using end-fire principles, wherein the shallowest element is fired first and then each deeper element is fired as the sound energy from the element above reaches it. This firing sequence is repeated until all the desired source elements have been fired. The sound energies from individual elements 37*a*, *b*, and *c* complement one another to form an effective signal having its own direction dependent characteristics. The method for operating a vertically staggered source array to produce a source signal is known to one of ordinary skill in the art. Operating source array 35 using end-fire principles and processing the acquired seismic data using methods known to one of ordinary skill in the art to remove Source Signal Ghosts will provide for the removal or reduction of the effects of Source Signal Ghosts on the processed seismic.

The vertically staggered source array operated together with a quasi over-under receiver array (as more fully described below) and the processing methods of the present invention act synergistically to reduce the effect of Signal Ghosts on the processed seismic signal. Also, vertically staggered source arrays allow sources to be towed deeper, thereby increasing the efficiency with which they emit sound energy into the water.

Quasi Over-Under Receiver Array

The following section describes representative quasi overunder receiver arrays in accordance with the current invention. Referring to FIGS. 2A, 2B and 2C, a quasi over-under receiver array 39 is shown which is capable of being used in the present invention. Array 39 is towed behind a seismic boat 40. Receiver array 39 is comprised of streamers 41*a*, *b*, and *c*. While three streamers 41*a*, *b*, and *c* are shown, for purposes of the invention, only two streamers are necessary. Extra streamers may be added if desired. In general, it is easier to control the position of the streamers within a given acquisition pass than to control the position of the streamers with respect to each other from one pass to another across the survey. Therefore, it is preferable to tow at least four streamers, more preferably at least six streamers, most preferably at least eight streamers behind seismic boat 40. This will also improve the cost effectiveness of acquiring the survey.

Each streamer carries a plurality of seismic detectors along its longitudinal axis. In the following discussion, the seismic detectors referred to are hydrophones. However, geophones or any other type of seismic detector may be utilized with the present invention.

The streamer geometry of the acquisition system should be configured in a manner such that the data pertaining to the subsurface seismic lines, when viewed in the cross-line direction as a function of streamer depth, exhibit a repetitive pattern in the cross-line direction across the survey. This pattern, observed in the cross-line direction, is introduced by the cycling of the data pertaining to the subsurface seismic lines as a function of streamer depth variations. The pattern preferably should be the same across the survey area when viewed in the cross-line direction.

The Characteristic Wavelength of the pattern is the distance, measured in the cross-line direction, from the beginning of the cycle to the end of the cycle. It is believed that for any given number of different streamer towing depths, the Characteristic Wavelength for the pattern should preferably be made as short as practicable. It is not required that all streamers be towed at a different depth. However, in order to not limit the lateral streamer proximity, two adjacent streamers preferably should not be at the same depth.

Figure 9A:
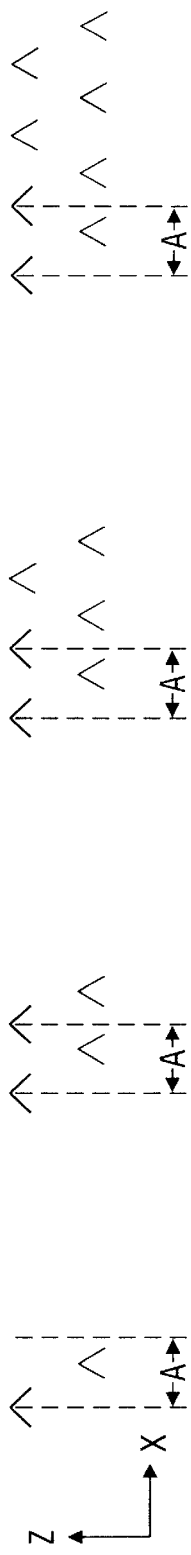
FIG. 9A is a diagrammatic rear view of quasi over-under receiver arrays according to the current invention having four, six, and eight seismic streamers and utilizing two different streamer depths. The diagram is intended to show the relationship of the streamers of the array to one another and to show the horizontal and vertical separation between the various streamers.
Figure 9B:
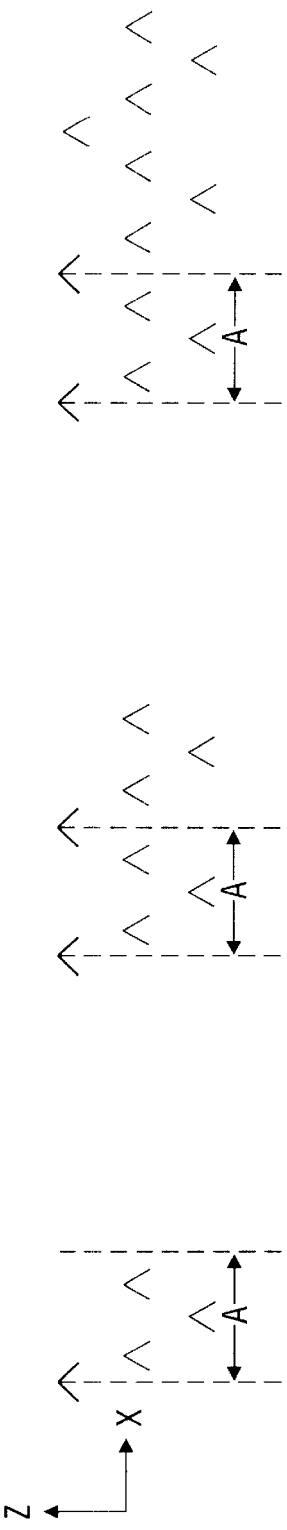
FIG. 9B is a diagrammatic rear view of quasi over-under receiver arrays according to the current invention having four, eight, and twelve seismic streamers and utilizing three different streamer depths. The diagram is intended to show the relationship of the streamers of the array to one another and to show the horizontal and vertical separation between the various streamers.

For example, if two streamer depths are utilized, it is preferable to use 2, 4, 6, 8, etc. streamers arranged as depicted in FIG. 9A. Each symbol ^ in FIG. 9A denotes a streamer being towed behind a seismic acquisition boat. FIG. 9A depicts quasi over-under receiver arrays using 2, 4, 6, and 8 streamers. For the array depicted in FIG. 9A, the seismic survey is acquired in such a way that when viewed in the cross-line direction, as a function of streamer depth, the sequence of the streamers across the survey forms a repeating V pattern. If three streamer depths are utilized, it is preferable to use 4, 8, 12, etc. streamers arranged as shown in FIG. 9B. Again, when viewed in the cross-line direction, as a function of streamer depth, the survey acquired using the system of FIG. 9B exhibits a repeating V pattern. FIG. 9B depicts quasi over-under receiver arrays using 4, 8, and 12 streamers. For surveys acquired with the quasi overunder receiver arrays depicted in FIGS. 9A and 9B, the Characteristic Wavelength is defined by the distance denoted by line A in FIGS. 9A and 9B.

Figure 9C:
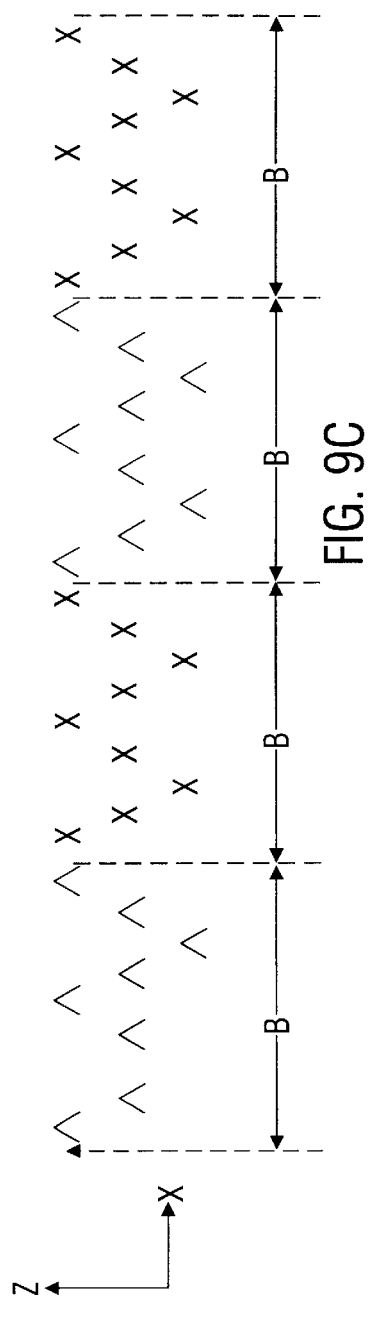
FIG. 9C is a diagrammatic rear view of a portion of a seismic data set that was acquired using a quasi over-under receiver array having nine seismic streamers.

A quasi over-under receiver array geometry using three streamer depths towed across the survey in a V formation can lead to a Characteristic Wavelength that is longer than necessary if a different number of streamers were being used. For instance, 9 streamers arranged in a W pattern as shown in FIG. 9C will result in a survey having a Characteristic Wavelength of nine rather than three lateral streamer distances (denoted by line B). In FIG. 9C, the ^'s denote 9 streamers arranged in a W pattern acquiring seismic data in a first pass and a third pass parallel to the in-line direction. The X's denote the same 9 streamers being towed in the inline direction during a second pass and a fourth pass across the survey area.

Now, referring to FIGS. 2A, 2B, and 2C, longitudinally, a streamer 41$a$, $b$, and $c$ will be located generally parallel to the streamer nearest it, but will be offset from such a streamer, both in the vertical and horizontal direction. Each streamer carries a plurality of hydrophones 27 which are distributed along its longitudinal axis. Hydrophones 27 may be distributed singly along the length of the streamer, or they may be arranged into hydrophone groups 43. At a minimum, the streamers in the quasi over-under receiver array should be located at two (2) different depths. However, if more than two streamers are being towed, there is no requirement that each streamer be located at a different depth. As boat 40 tows streamers 41$a$, $b$, and $c$ through the water, staggered source array 35 is fired creating sound energy that propagates through water 29 and into strata 31 underlying the water. The sound energy is reflected off, diffracted by, and/or refracted by a structure within strata 31 and travels up through strata 31 and water 29 until it reaches hydrophones 27. The collected sound energy is recorded using methods well known in the art and processed in accordance with processing methods described below.

In general, with conventional 3D marine seismic acquisition, it is difficult to effectively maintain a constant horizontal separation between streamers. Typically, long cables (on the order of 3000 to 6000 meters) are towed no closer than 50 meters in order to prevent streamer entanglement. This distance limitation is due, at least in part, to the difficulty in effectively controlling the position of the towed streamers in the horizontal plane. However, it is generally much easier to control the position of the streamers in the vertical plane than in the horizontal plane. The horizontal position can incur undesirable shifts due to currents that are on the order of several hundreds of meters, while the vertical position can be controlled within a few meters. Vertical control is routinely achieved using depth controllers or so-called birds, known to one of ordinary skill in the art. The present invention takes advantage of this by offsetting the streamers with respect to each other in both the vertical and horizontal planes. The processing methods of the present invention provide a means for reducing the effects of the different Receiver Signal Ghosts which result from such a receiver configuration. The above described configuration allows the horizontal separation between the streamers to be significantly reduced relative to the separation necessary in a conventional 3D marine seismic survey. And, with less separation between each streamer, the subsurface line spacing for the seismic survey can be reduced. In general, as the spacing between subsurface seismic lines decreases, the lateral resolution of the processed seismic data increases.

Typically, boat 40 will make several passes over an area to collect sufficient data for later processing using the present invention. Preferable, boat 40 will make sufficient passes over the area to obtain a seismic data set having seismic surface line spacing of no more than 100 meters, more preferably no more than 50 meters, most preferably no more than 25 meters. In general, for a single source survey or a single vertically staggered source array, the above described seismic line spacing will result in subsurface line spacing of 50 meters, 25 meters, and 12.5 meters, respectively.

The seismic data may be collected using various survey designs. For example, the seismic data may be collected by a single survey boat using a single seismic source or multiple seismic sources. The seismic data also may be collected using more than one survey boat. What is important for the current invention is that seismic data is collected in such a manner that the minimal subsurface line spacing is not limited by the horizontal streamer separation. Also the seismic data should be collected in such a way that, when viewed in the cross-line direction, the subsurface seismic lines attributable to particular streamer depths follow a repetitive pattern. It is preferable to acquire a seismic survey in such a manner that there is only one Characteristic Wavelength. However, in some aspects of the invention, there may be more than one Characteristic Wavelength for the seismic survey.

Figure 3:
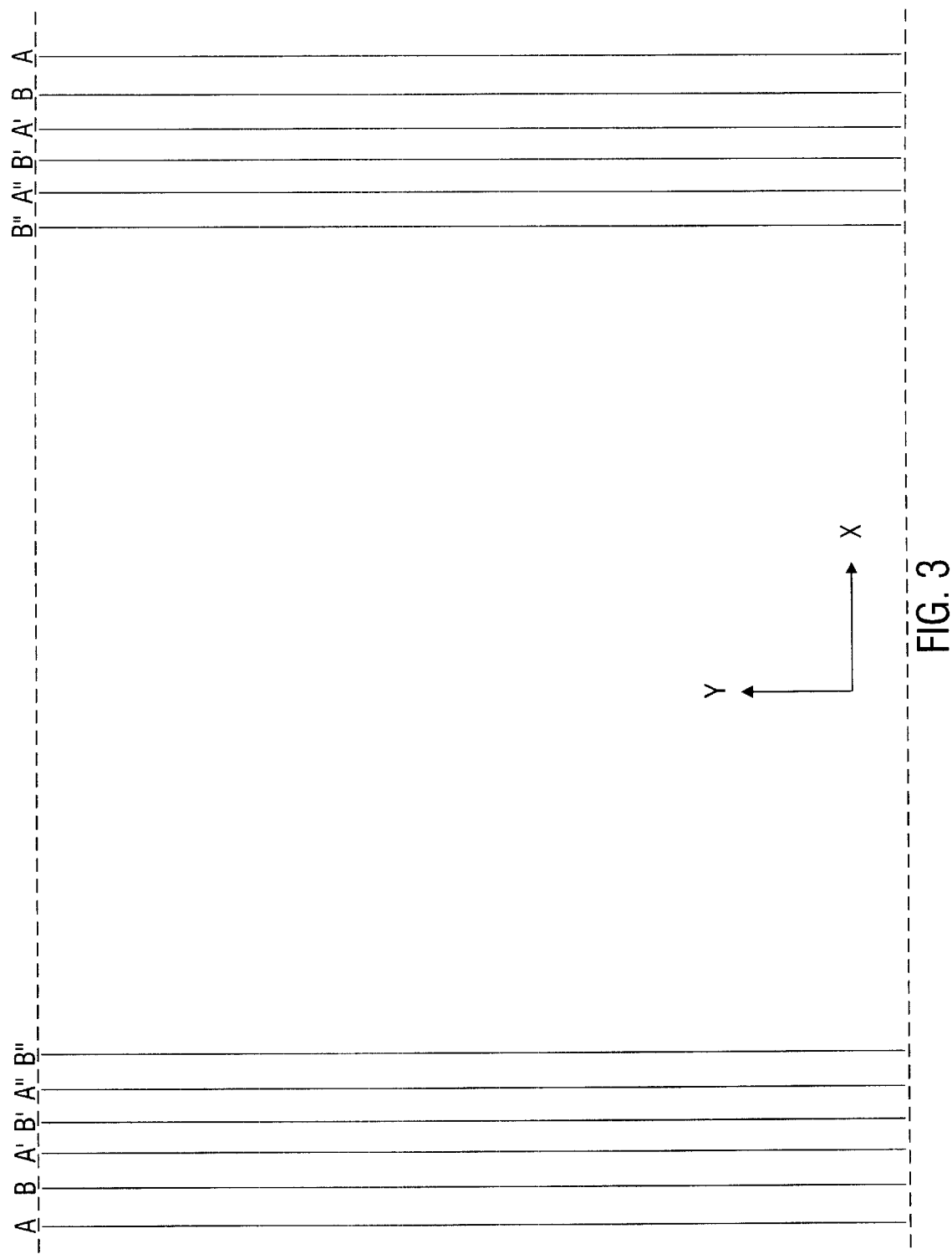
FIG. 3 is a diagrammatic view of subsurface lines acquired with a quasi over-under receiver array having two seismic streamers. The figure only shows the subsurface seismic lines acquired in the first three seismic acquisition passes around a modified racetrack pattern, such as shown in FIG. 8.
Figure 4A:
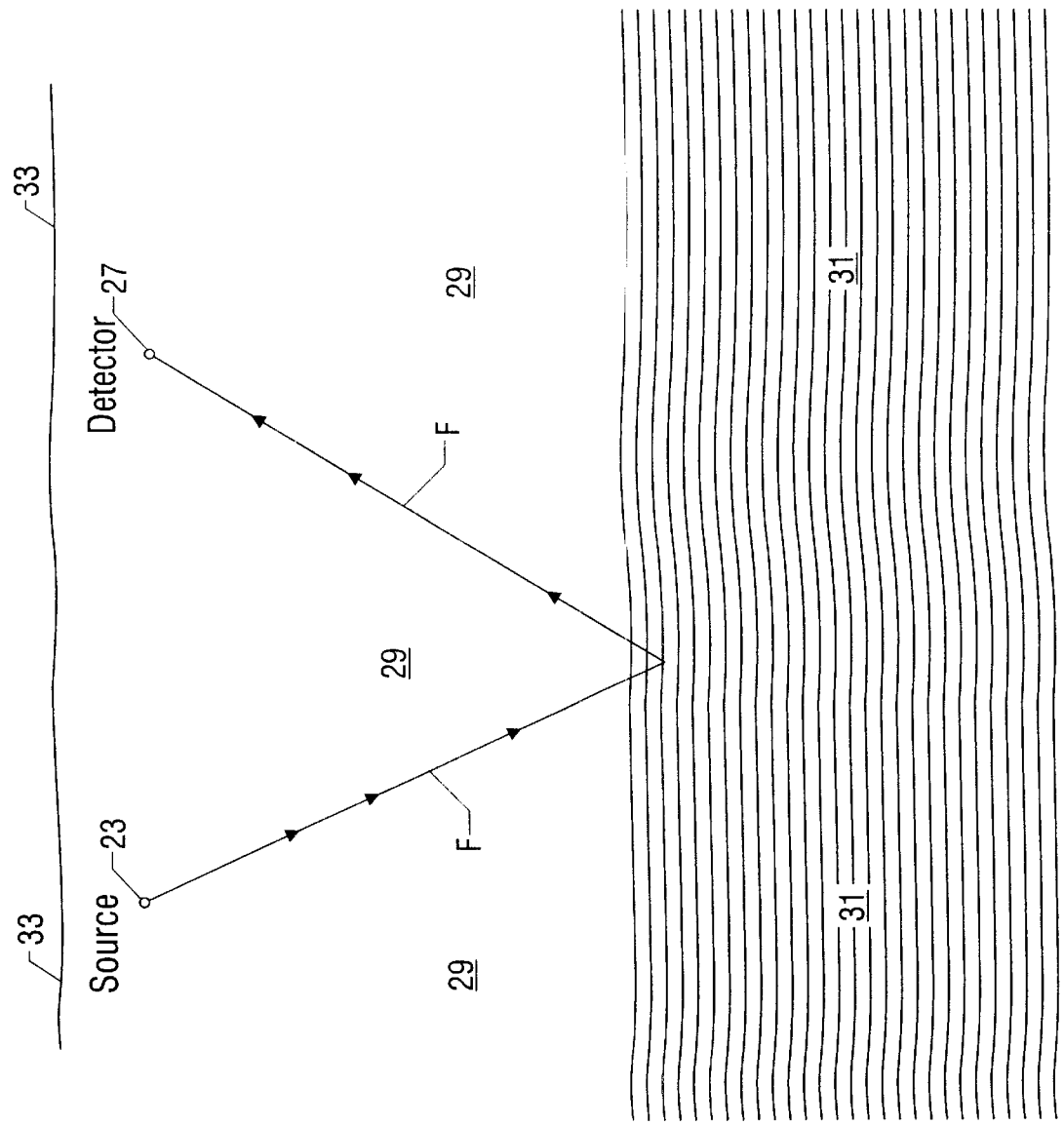
FIG. 4A is a diagrammatic, cross-sectional, view of the water and the strata underlying the water, which depicts the ray path (F) of a primary signal as it travels from the seismic source to the seismic detector.
Figure 4B:
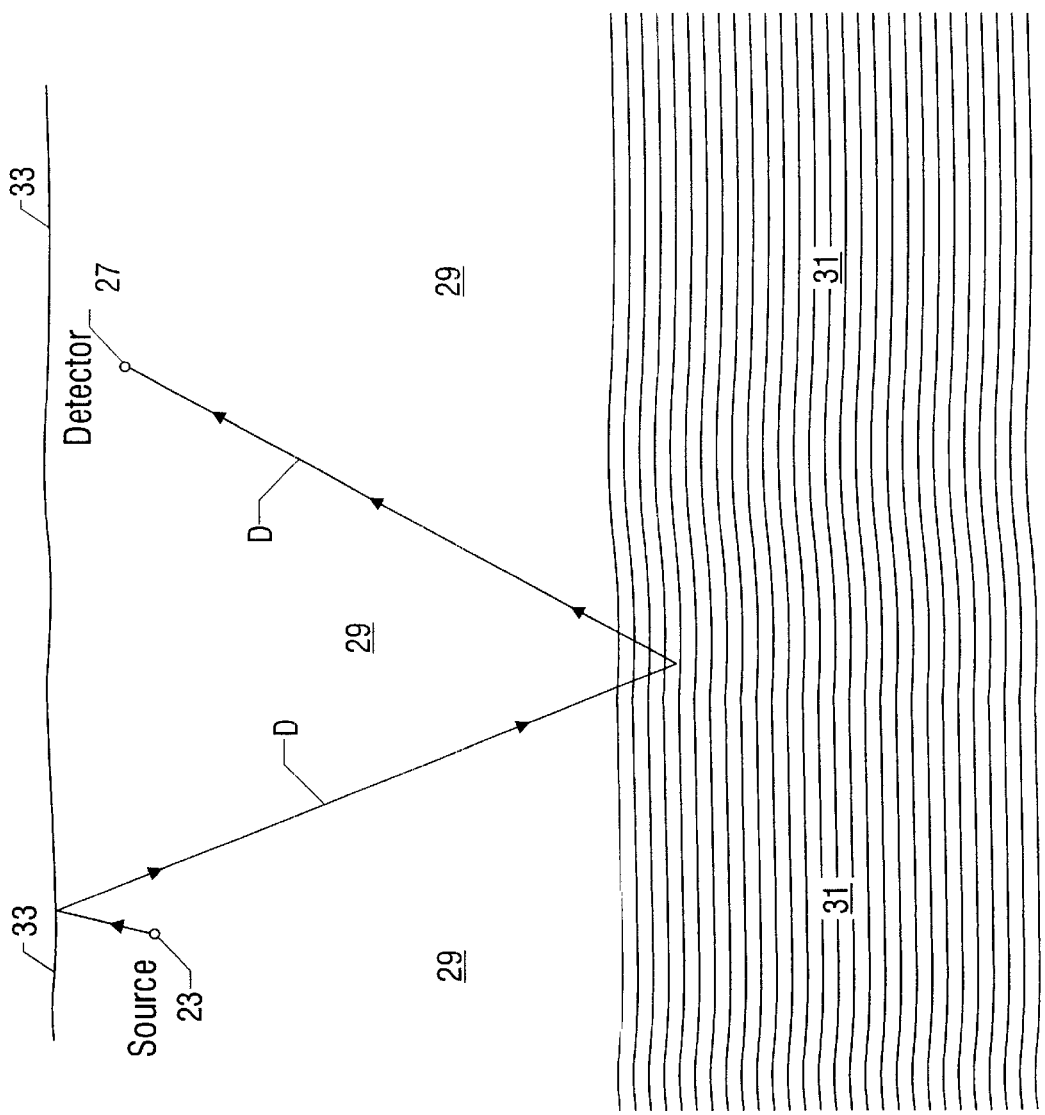
FIG. 4B is a diagrammatic, cross-sectional, view of the water and the strata underlying the water, which depicts the ray path (D) of a Source Signal Ghost as it travels from the seismic source to the seismic detector.
Figure 4C:
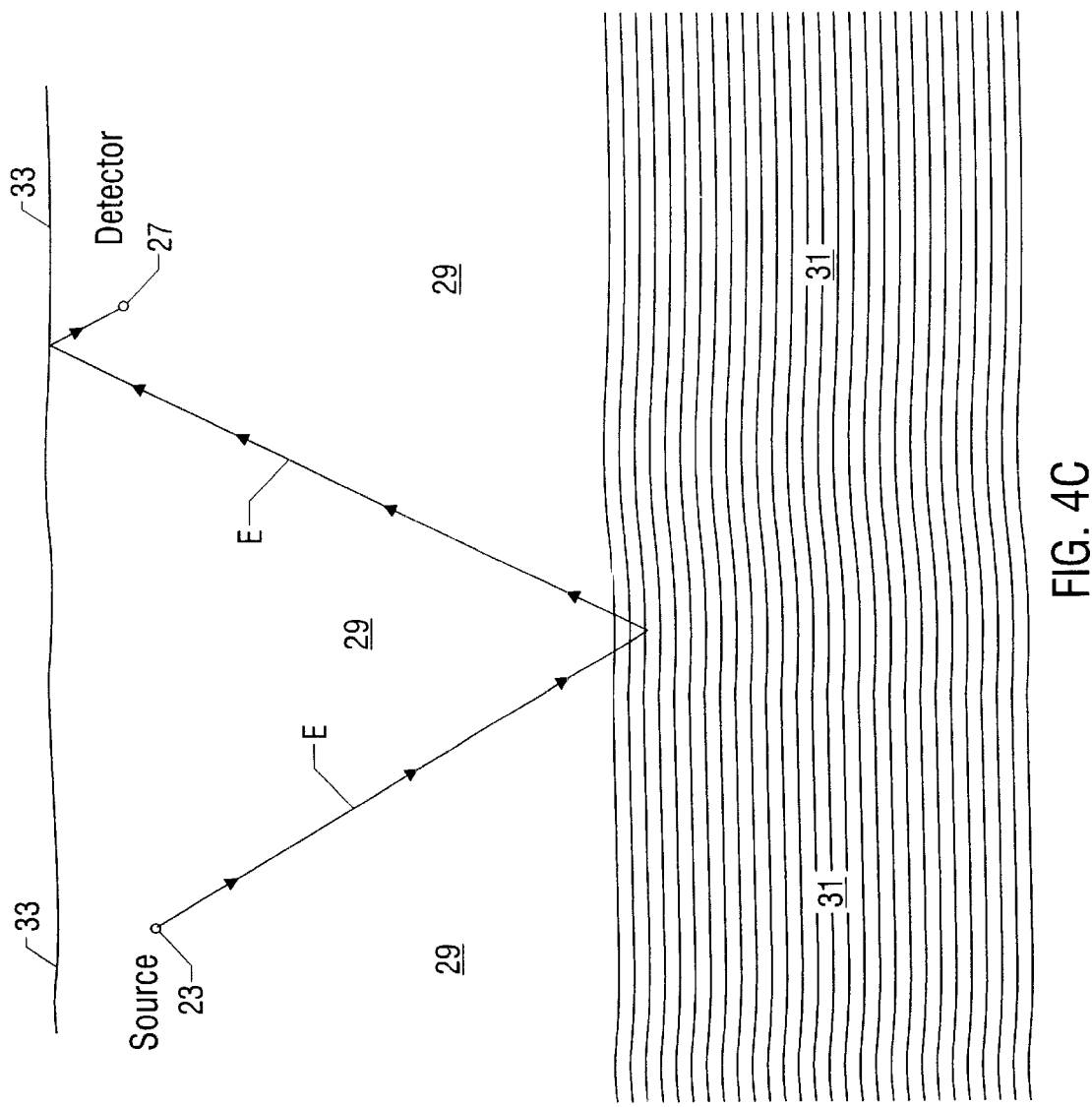
FIG. 4C is a diagrammatic, cross-sectional, view of the water and the strata underlying the water, which depicts the ray path (E) of a Receiver Signal Ghost as it travels from the seismic source to the seismic detector.
Figure 8:
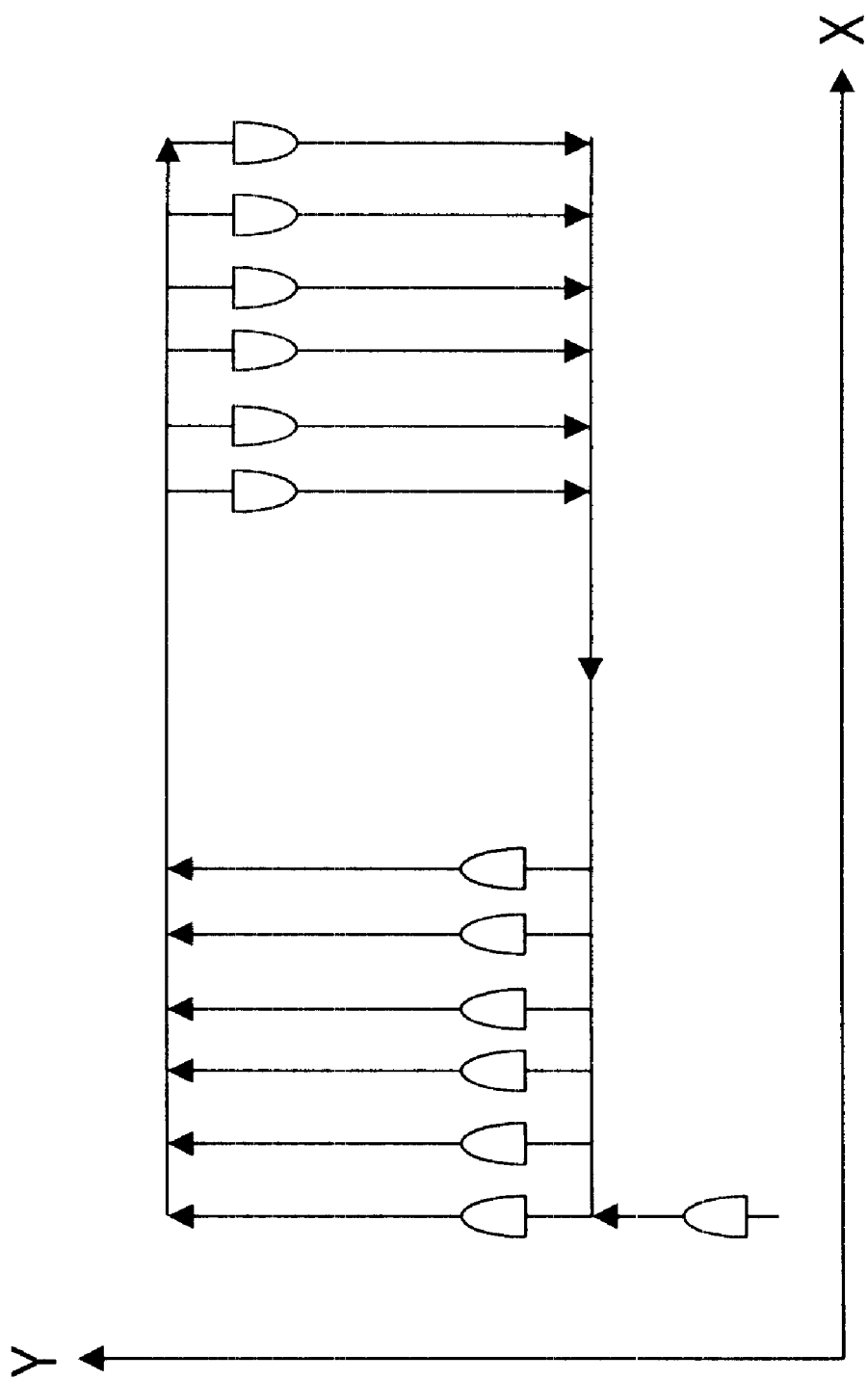
FIG. 8 is diagram depicting a seismic data set being acquired according to a modified race track acquisition pattern.

Referring to FIGS. 2 and 3, the seismic survey shown in FIG. 3 is collected using a single boat 40 having a single vertically staggered source array 35 and two streamers, each streamer being located at a different depth. The survey design shown in FIG. 3 can be collected using a modified race track pattern or any other suitable pattern. A modified racetrack pattern is shown in FIG. 8. In this type of pattern, the seismic boat or boats acquire seismic data while traveling in the in-line direction (in FIG. 3 shown parallel to the y-axis), but does not acquire data when traveling in the cross-line direction. The seismic boat adjusts its course on each in-line segment to ensure that subsurface coverage is evenly spread. This may require the acquisition surface geometry to overlap. The seismic boat follows the modified racetrack pattern until it has acquired seismic data over the entire survey area.

Line A in FIG.3 denotes the subsurface seismic line corresponding to the first streamer and line B denotes the subsurface seismic line corresponding to the second streamer, which are acquired in the first passes around the racetrack pattern. Lines A' and B' denote the subsurface seismic lines acquired in the second passes around the racetrack pattern. Lines A" and B" denote the seismic data acquired in the third passes around the racetrack pattern. While not shown, the remaining lines are collected in a similar fashion.

It should be noted that if boat 40 continues to acquire data using a racetrack pattern, the subsurface seismic lines in the middle of the survey will have the wrong ordering with respect to each other (i.e. in the middle of the survey, two subsurface seismic lines attributable to the second streamer will be adjacent one another). Therefore, in the example shown, boat 40 should adjust its acquisition path and techniques on at least one pass to ensure that the proper relationship between the subsurface seismic lines is obtained for use in the current invention. This may be done by boat 40 shooting with one streamer overlap, by only acquiring seismic with the first streamer on the last acquisition pass, or by boat 40 leaving a gap in the coverage of the seismic survey. This gap can then be artificially filled during processing through interpolation. Alternatively, the acquired survey can be split into parts which are each processed in accordance with the current invention. Any other methods of acquisition that would be apparent to one of ordinary skill in the art can be utilized to achieve the desired relationship among the subsurface seismic lines.

In the present invention, it is desirable to maintain the horizontal spacing between A and A' approximately the same as the horizontal spacing between A' and A'. Likewise, it is desirable to maintain the horizontal spacing between B and B' approximately the same as the horizontal spacing between B' and B'. This will result in a single Characteristic Wavelength, as will be discussed more fully below, the Characteristic Wavelength will be used in the processing of the seismic data to reduce the effect of Receiver Signal Ghosts on the processed seismic signal.

Method for Processing the Acquired Seismic Data

For the following discussion, we have assumed that a single source is used. When more than one source is used it may be necessary to order the seismic data into subsets according to the source used to acquire the data. Each data subset can be independently processed as described below. If desired, the data subsets can be combined after the processing steps, described below, are completed for each subset.

It has been surprisingly discovered that seismic data exhibiting a repetitive pattern in the cross-line direction as a function of the variation of streamer depth used to acquire the data can be processed by a method that greatly reduces the effects of Receiver Signal Ghosts on the seismic signal, while not compromising the spatial resolution of the processed seismic data.

For a conventional seismic acquisition design, where all the hydrophones are located at roughly the same vertical position, the Receiver Signal Ghosts recorded for each hydrophone or hydrophone group arrive at approximately the same time and have the same effect on the seismic signal. This results in ghost notches that occur at approximately the same frequency throughout the survey. Since the Receiver Signal Ghosts arrive at approximately the same time throughout the seismic survey (i.e. ghost notches occur at approximately the same frequency), it is very difficult or impossible to remove the effects of Receiver Signal Ghosts from such a seismic data set.

Figure 5A:
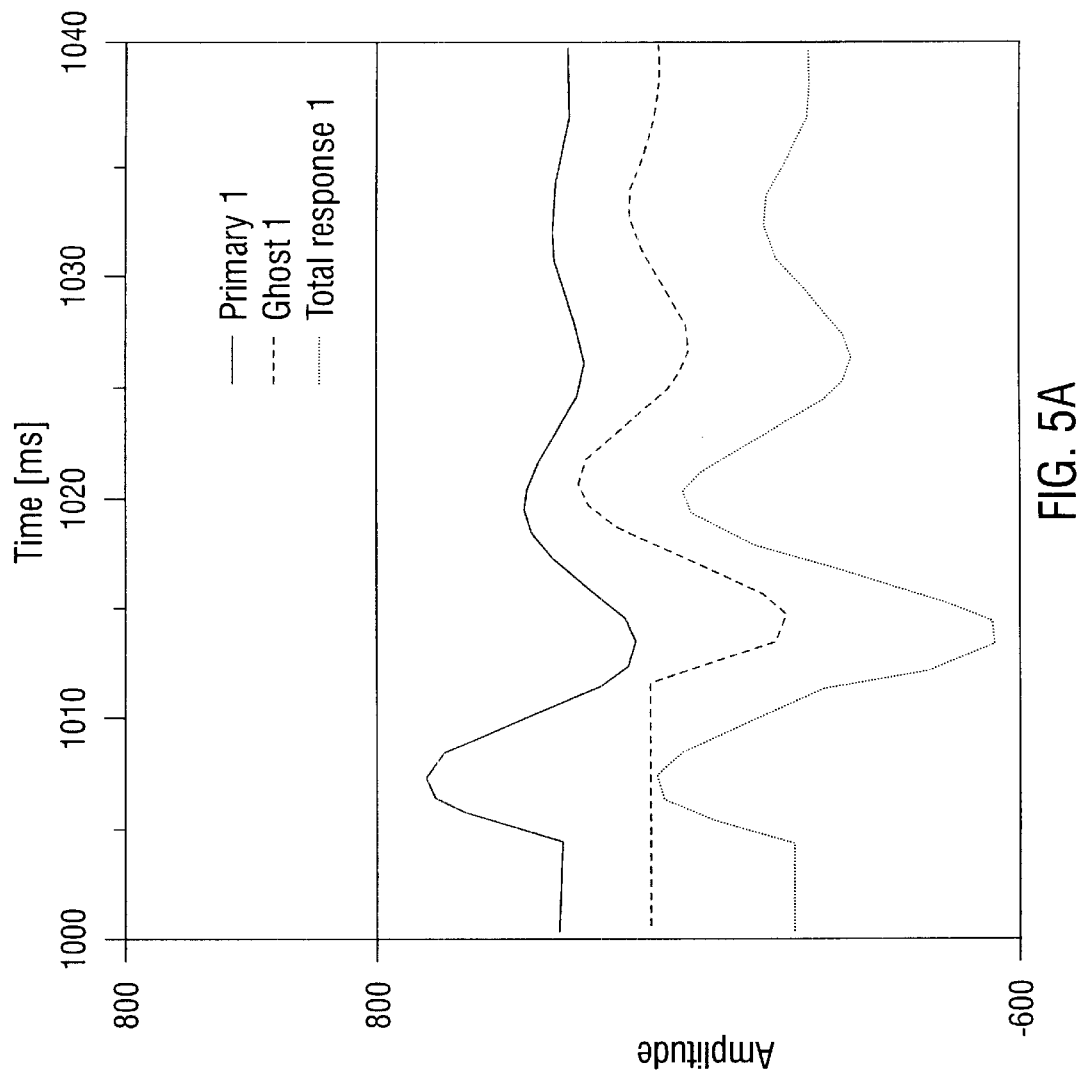
FIG. 5A is a diagrammatic plot depicting seismic data recorded by a seismic detector located at a first depth and the primary signal and the Receiver Signal Ghost that result from the decomposition of the recorded seismic data.
Figure 5B:
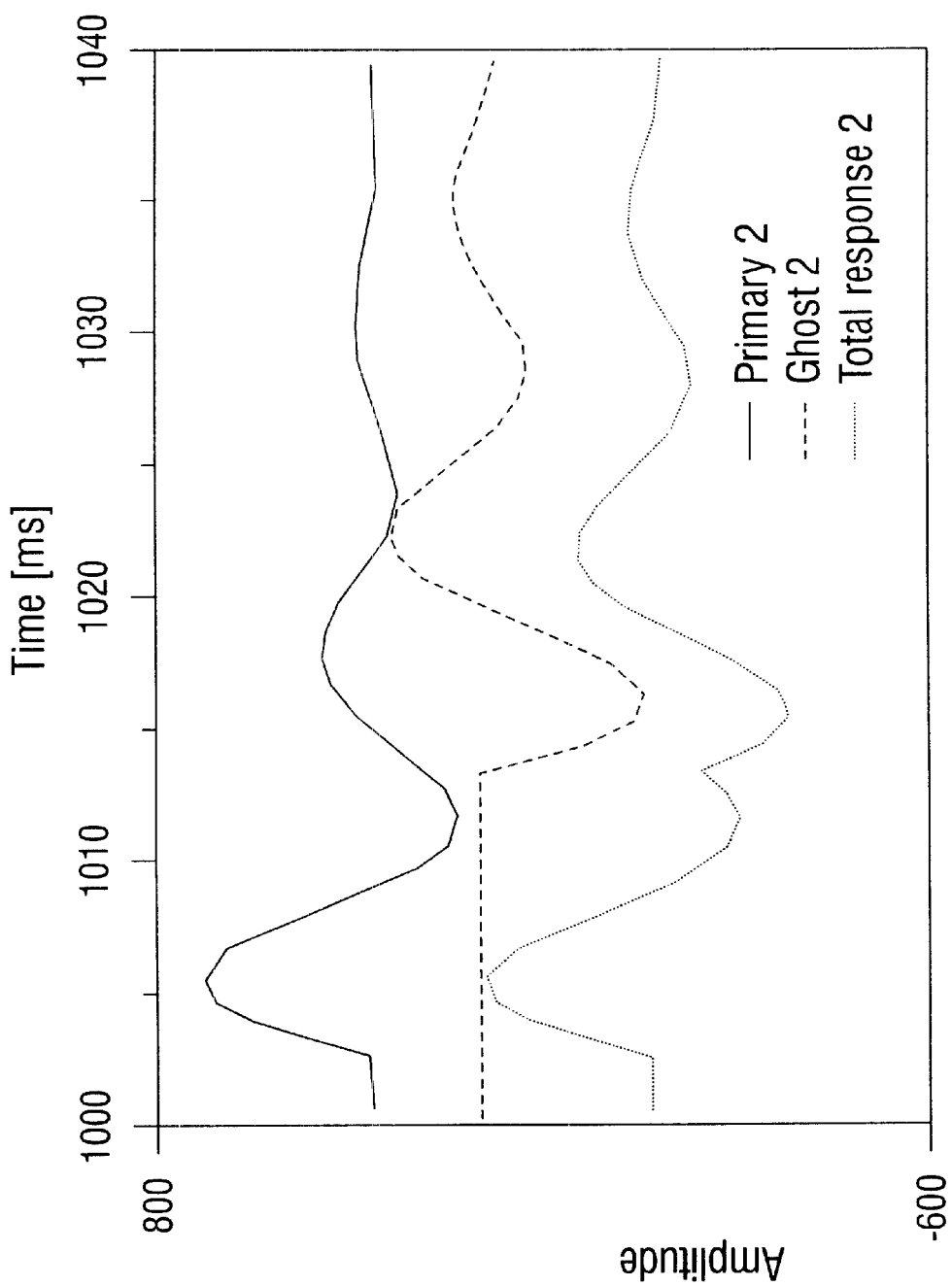
FIG. 5B is a diagrammatic plot depicting seismic data recorded by a seismic detector located at a second depth and the primary signal and the Receiver Signal Ghost that result from the decomposition of the recorded seismic data.
Figure 5C:
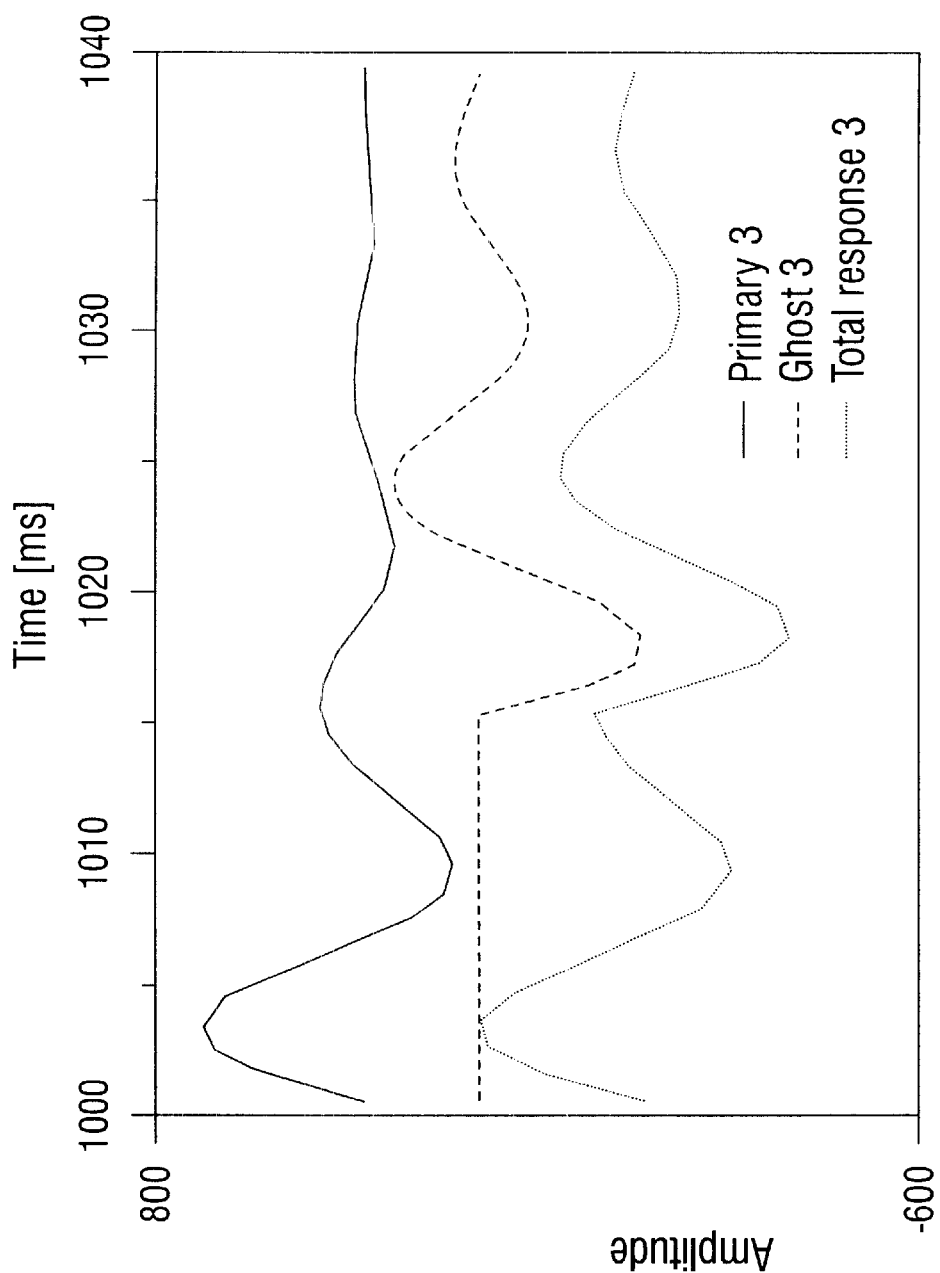
FIG. 5C is a diagrammatic plot depicting seismic data recorded by a seismic detector located at a third depth and the primary signal and the Receiver Signal Ghost that result from the decomposition of the recorded seismic data.

However, for the quasi over-under receiver array as utilized in the present invention, the Receiver Signal Ghosts arrive at differing times depending on the vertical position of the hydrophone detector. FIGS. 5A, 5B, and 5C each depict the wavelet measured at a different detector for a common reflection point. Each detector is located at a different vertical and horizontal location within the quasi over-under receiver array. FIGS. 5A, 5B, and 5C also show the decomposition of the wavelet into a primary signal and a Receiver Signal Ghost for each detector.

It is preferred that a detector is maintained at the same depth throughout the seismic survey, because then the Receiver Signal Ghost will effect the recorded sound energy in an equivalent manner throughout the survey. There will be a variation in the effect of the Receiver Signal Ghost on one detector (which is located at a first depth) with respect to the effect of the Receiver Signal Ghost on a second detector (which is located at a second depth). However, the effect of a Receiver Signal Ghost on the same detector over the course of an entire seismic acquisition survey will be relatively constant (assuming that the detector is maintained relatively at the same depth throughout the survey). Additionally, the effect of Receiver Signal Ghosts on different detectors which are located at the same depth should be approximately the same.

Therefore, the depth of each streamer should be monitored throughout the survey and adjusted using depth controllers, as necessary, to maintain the detectors at the proper depth.

It has been found that seismic data acquired according to the current invention introduces a predictable periodicity into the data that can effectively be removed using the appropriate filtration means. The present invention takes advantage of this periodicity in the effect of Receiver Signal Ghosts on the sound energy recorded across the seismic data set to remove the effect of the Receiver Signal Ghosts from the processed seismic signals, without degrading the spatial resolution of the processed seismic signals. It is believed that the processing methods of the current invention will also be effective for removing the effect of Receiver Signal Ghosts from any seismic data set which exhibits a similar predictable periodicity in the cross-line direction as a function of the streamer depth used to acquire the data, irrespective of the manner in which the data sets were acquired or constructed.

In a first embodiment of the processing method, in order to reduce the effect of Receiver Signal Ghosts on a seismic data set acquired using a quasi over-under seismic array the following steps are carried out:

Step (1) the data are placed into gathers based on common offset and common in-line position, which are sorted according to the data's position in the cross-line direction (If the processing methods of the invention are carried out post-stack, then the data should be placed into gathers based on common in-line position, which are sorted according to the data's position in the cross-line direction); and Step (2) a filter is applied that removes the larger part of the cross-line trace to trace variation caused by the different delays between Receiver Signal Ghosts pertaining to those traces.

After steps (1) and (2) have been performed, the resultant data can be taken out of the gathers and processed in accordance with methods known to one of ordinary skill in the art. Steps (1) and (2) can be carried out at any time during the processing of the seismic data. However, it is preferable to perform the above steps prior to stacking the seismic data. More preferably, the above steps should be performed prior to performing DMO, NMO, migration, and other multi-trace operations. NMO, DMO, migration, and other multi-trace operations performed after the above steps will further reduce the effect of the alternating Receiver Signal Ghosts and will ameliorate possible artifacts that steps (1) and (2) may introduce into the seismic data set. The combined effect of processing through steps (1) and (2) and the multi-trace operations will greatly improve the quality of the final seismic data set.

The seismic data preferably should be processed to a common datum prior to applying the filter of Step (2). This can be done by processing methods known to one of ordinary skill in the art. Preferably, the data is processed to align the primary signals. Alternatively, the data may be processed to align the Receiver Signal Ghosts.

In one aspect, the data is processed to align the primary signals, the resulting data being saved as a first data set. The original data is then processed to invert all signals and align the Receiver Signal Ghosts to create a second data set. The first and the second data sets are combined into one data set that is further processed in accordance with the current invention.

In another aspect, the first and second data set created are processed separately in accordance with the current invention and processing methods known to one of ordinary skill in the art and combined at a later time.

Placing the data into gathers based on actual in-line position is not required. In general, placing the data into gathers based on nominal in-line position is adequate. Also, it is sufficient for purposes of the invention that the data be sorted according to nominal position in the cross-line direction. Sorting the data according to actual position in the cross-line direction is undesirable. The key condition that must be satisfied prior to application of processing step (2) is that the data be arranged in such a way that the streamer depths corresponding to the data being processed, when observed in the cross-line direction follow a repetitive pattern as described herein. It is believed that in some instances, it may be advantageous to construct gathers where the data's position in the panel maintains the periodicity described above, but does not correspond to the data's actual or nominal cross-line position in the seismic survey. It is believed that as long as these translocation events are minimized, the integrity of the processing in accordance with the invention will not be compromised.

Removing the Cross-line Trace to Trace Variations

There are various ways the filter in step (2) can be implemented for removing the cross-line trace to trace variations. Two versions are outlined here but any other filters that remove the predictable portion of the seismic signal attributable to the Characteristic Wavelength of the acquired data can be utilized. The removal of the undesired periodic cross-line variations will remove the jittery appearance of cross-line sections and at the same time will reduce the effects of the Receiver Signal Ghosts.

In one aspect, the data from Step (1) is transformed from the time-distance domain in the cross-line direction (t, x) to the frequency-wavenumber (f-k) domain by performing a two-dimensional Fourier Transform. In common mathematical symbols this transformation is written as:

$$S(f,k) = \int_{-\infty}^{\infty}\int_{-\infty}^{\infty} s(t,x) e^{-j2\pi ft} e^{jkx} dt dx \qquad \text{Eq. (2)}$$

S(f,k) and s(t,x) are the representations of the signal in different domains

Figure 6:
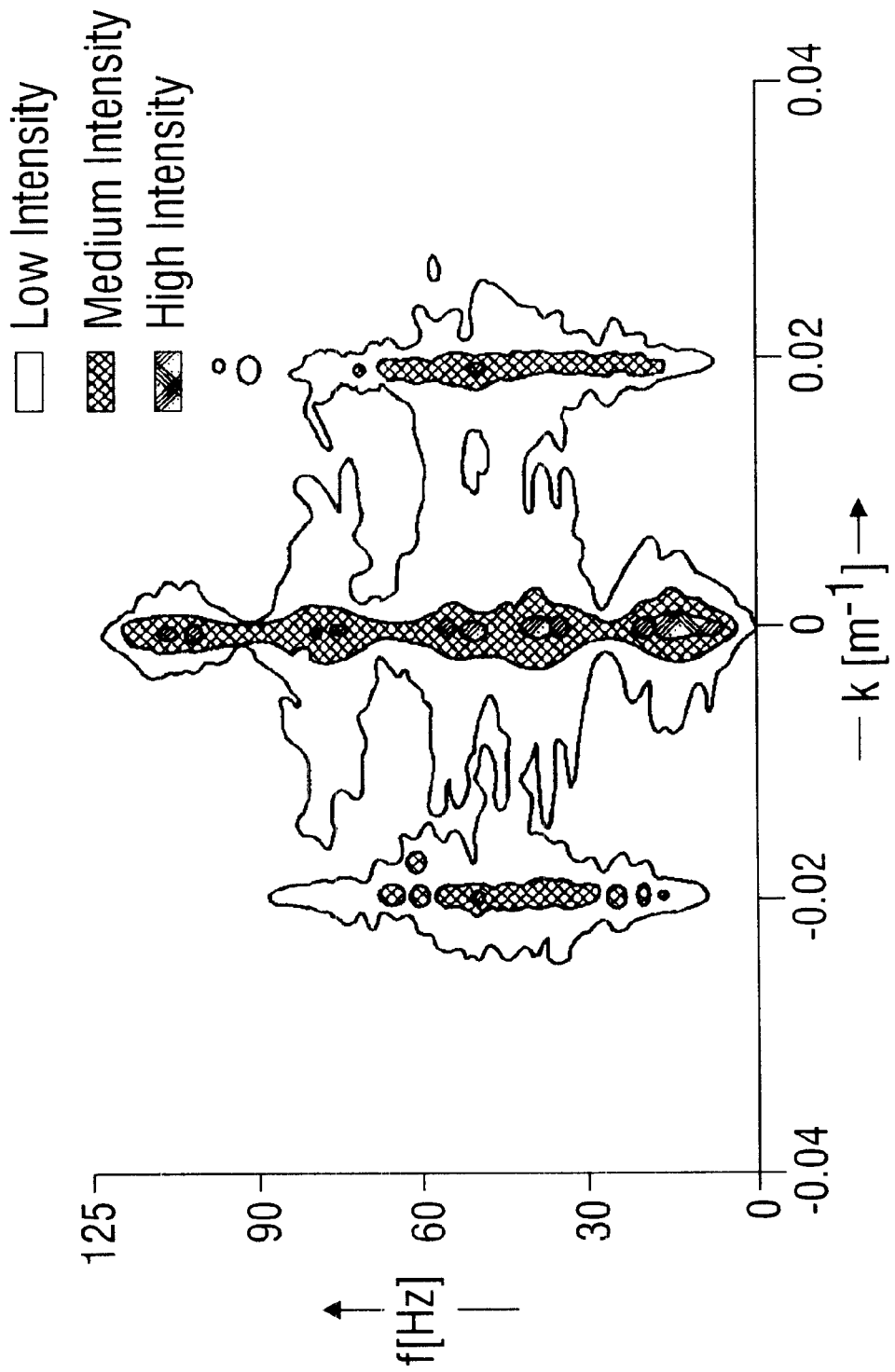
FIG. 6 is a k-f plot showing the amplitude of a seismic data set having artificial Receiver Signal Ghosts imparted to the data set described in the Example, before a filter in accordance with the current invention was applied.
Figure 7:
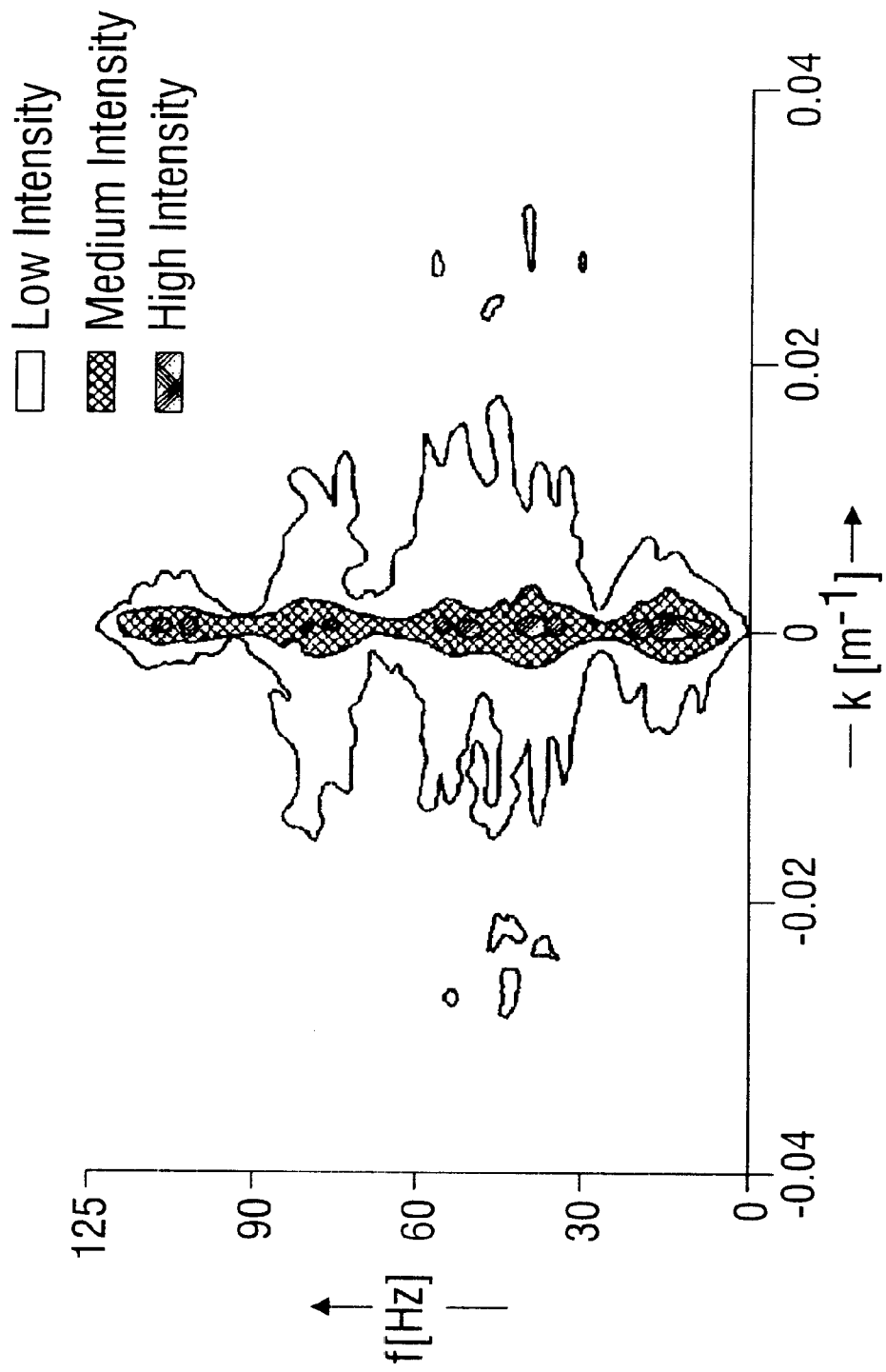
FIG. 7 is a k-f plot showing the amplitude of the seismic data set of FIG. 6, after a filter in accordance with the current invention was applied.

Referring now to FIG. 6, which is an idealized depiction showing an f-k plot of a seismic data set which exhibits a predictable periodicity in the cross-line direction. FIG. 7 depicts the data after a filter as described in step (2) above was applied. In FIGS. 6 and 7 both positive and negative k values are plotted, but only positive values for f are plotted. The values of k plotted on FIGS. 6 and 7 provide a minimal but sufficient representation of the data when dealing with real time signals. The k values in FIGS. 6 and 7 range from −0.04 to +0.04 and correspond to a trace or subsurface line spacing of 12.5 m.

Within the f-k domain, the repetitive wavelet variation in the cross-line direction, attributable to the Characteristic Wavelength, manifests itself as ridges or spikes at pre-defined k-values, as shown in FIG. 6 (The ridges at k values −0.02 and +0.02 relate to a Characteristic Wavelength of 50 m). These ridges can be removed by applying k-notch filters to the data set. For the seismic survey design depicted in FIG. 3, the k-notch values of the filters to apply will be inversely proportional to the distance between line A and A' (the Characteristic Wavelength). The fundamental value for k corresponds to the first ridge of noise, which is depicted in FIG. 6 as being centered around the values +0.02. The approximate fundamental value for k can be determined from the following Eq. (3):

$$k_q = 1/L_x \qquad \text{Eq.(3)}$$

Where, $k_q$ is the fundamental value for k $L_x$ is the Characteristic Wavelength k is comprised of both negative and positive components. Therefore, k-notch filters should be applied at both the negative and positive values of $k_q$. The k-notch filters should preferably be applied at the fundamental and selected harmonic values for k. How many harmonic values for k to filter is to be determined by a person of ordinary skill who is processing the data. Also, as discussed earlier, some seismic survey designs will lead to more than one Characteristic Wavelength. In that instance, more than one fundamental value for k may need to be determined and the appropriate filter applied.

The filtered seismic data set is taken out of the gathers established in step (1) and transformed to the desired domain for continued processing in accordance with seismic processing methods known to one of ordinary skill in the art.

Note that the data from step (1) may alternately be transformed from the t-x domain to the t-k domain using one-dimensional Fourier transformation techniques known to one of ordinary skill in the art. Subsequent to this transformation, a k-notch filter as described above can be applied.

Alternatively, the data need not be transformed at all, instead, the k-notch filter described by Eq. (3) may be transformed to the t-x domain and applied directly to the data sorted in step (1).

In a second aspect, the data sorted in step (1), are preferably first shaped so that the amplitude of the data wavelet is equal over larger parts of the frequency spectrum, only deviating at the values near the ghost notch. In this aspect, a discrete filter is applied in step (2), at the specific fundamental values for kq and its harmonics (as calculated from Equation (3) above) but only at and near the ghost notch values of f (as calculated from Equation (1) for each streamer depth). This k-f filter surgically removes energy from the two dimensional spectrum. This reduces the remaining variation of the data in the cross-line direction.

In a third aspect, a predictive filter, such as a Wiener type of filter is applied to the data sorted in step (1) to predict the lateral repetitive variations in the data. A Wiener type of filter, when applied at constant reflection times predicts the repetitive (predictable) variations in cross-line direction and subtracts them from the recorded data. This repetitive noise should be mainly attributable to the Receiver Signal Ghosts. The resultant data is taken out of the gathers and is processed in accordance with methods known to one of ordinary skill in the art.

In a second embodiment of the processing method, step (1) and (2) above, are not applied and the data are processed using 3 dimensional ("3D") migration methods, either a method that utilizes a one-pass 3D algorithm or a method that uses a two-pass 2D algorithm, both as known to one of ordinary skill in the art. It is believed that these 3D migration methods will at least partially remove the cross-line trace to trace variations caused by the different delays between Receiver Signal Ghosts. In this embodiment, the data preferably should be shaped, prior to carrying out the 3D migration method, so that the amplitude of the data wavelet is equal over larger parts of the frequency spectrum.

EXAMPLE

The following example shows the ability to remove Receiver Signal Ghosts from a seismic data set using the processing methods of the current invention. This example also shows that this noise can be removed without significant degradation of the quality and/or resolution of the processed seismic.

In this example the simplest processing method of the current invention is applied to a semi-synthetic seismic data set. The semi-synthetic seismic data set was created by convolving simulated Receiver Signal Ghosts onto a conventionally acquired post-stack 3D marine seismic data set.

This case mimics some of the most unfavorable conditions because it uses data which has been strongly corrupted by Receiver Signal Ghosts. Further, the k-notch filter is applied post-stack instead of pre-stack, as preferred in the current invention. In addition the simulated streamer pattern has a Characteristic Wavelength of four lateral streamer distances rather than the more obvious and more favorable Characteristic Wavelength of two lateral streamer distances. The extreme conditions used in this example most clearly demonstrate the capability of the processing of the current invention to remove Receiver Signal Ghosts that vary from seismic line to seismic line in a repetitive pattern.

The conventional data used for this test was acquired with a single source towed at a depth of 6 meters and receivers towed at depths of 7.5 meters. The conventional data set exhibited Signal Ghosts causing first ghost notches at 100 hertz and 125 hertz. Since the depth of all the streamers were kept relatively constant across the survey, the notches appear all at the same frequency and can not be removed using the processing methods of the current invention. Therefore, in order to test the effectiveness of the current invention, simulated Receiver Signal Ghosts were convolved with traces from alternating subsurface seismic lines of the survey.

Figure 11:
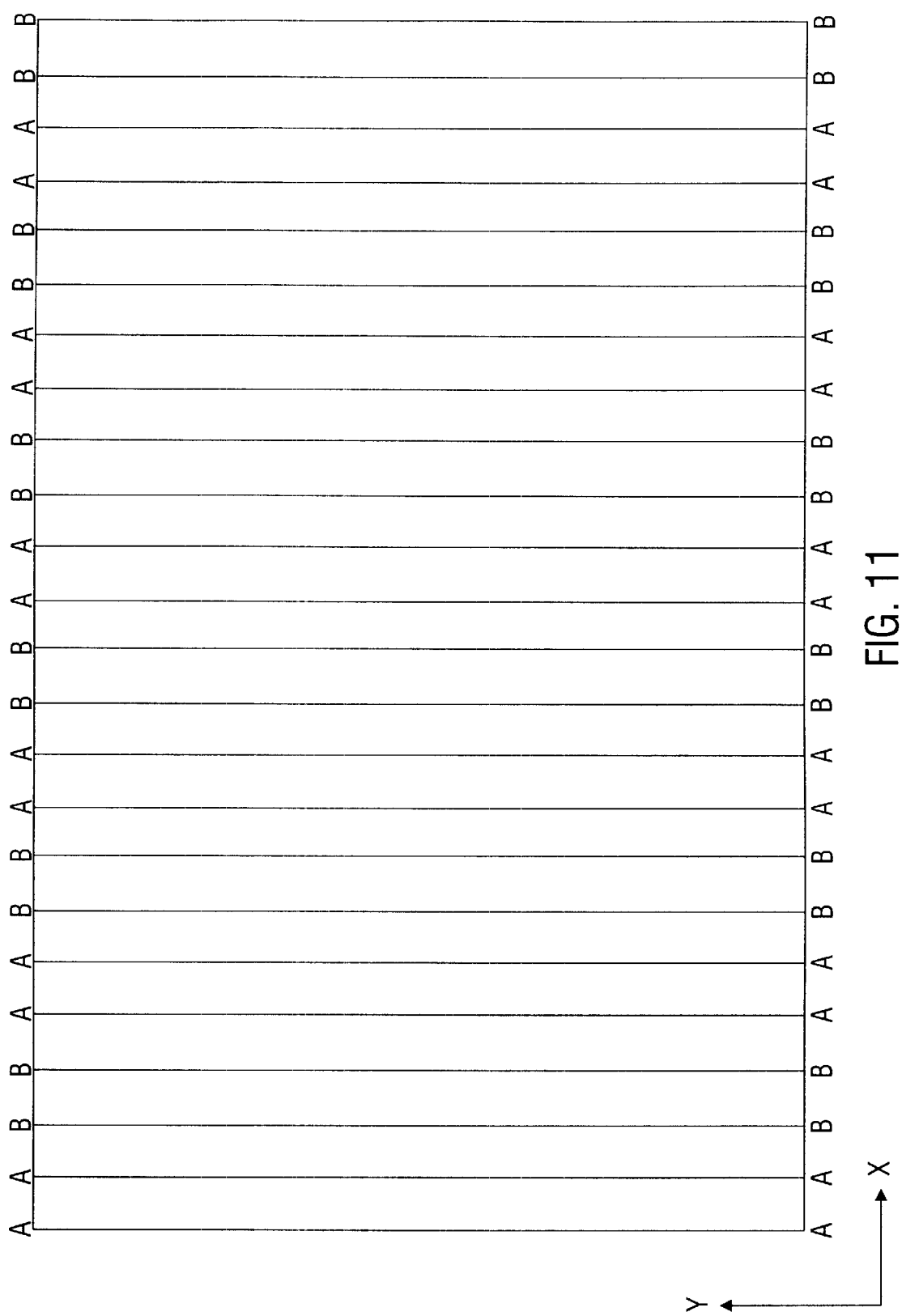
FIG. 11 depicts the pattern in which Receiver Signal Ghosts were imparted onto the seismic survey used in the Example. The seismic data pertaining to subsurface seismic lines labeled A correspond to an imparted streamer depth of 23.44 meters. The seismic data pertaining to subsurface seismic lines labeled B correspond to an imparted streamer depth of 31.25 meters.

The Receiver Signal Ghosts that were convolved with the data correspond to Receiver Signal Ghosts that would result from streamers towed at a depth of 31.25 meters and a depth of 23.44 meters. The repetitive pattern that manifests itself across the survey is depicted in FIG. 11, where the letter A designates subsurface seismic lines corresponding to streamer towed at a depth of 23.44 meters and the letter B designates subsurface seismic lines corresponding to streamers towed at a depth of 31.25 meters. With a sound velocity in sea water of 1500 meters/second, the corresponding first ghost notches appear at 32 hertz and 24 hertz respectively. As discussed earlier, with conventional seismic acquisition and processing, no seismic signal would be usable at frequencies near and greater than the first ghost notch. The first ghost notches are clearly visible in FIG. 12, which is a frequency spectrum plot of the semi-synthetic data prior to processing in accordance with the current invention (The estimated signal is solid, the estimated noise is dashed).

Figure 13:
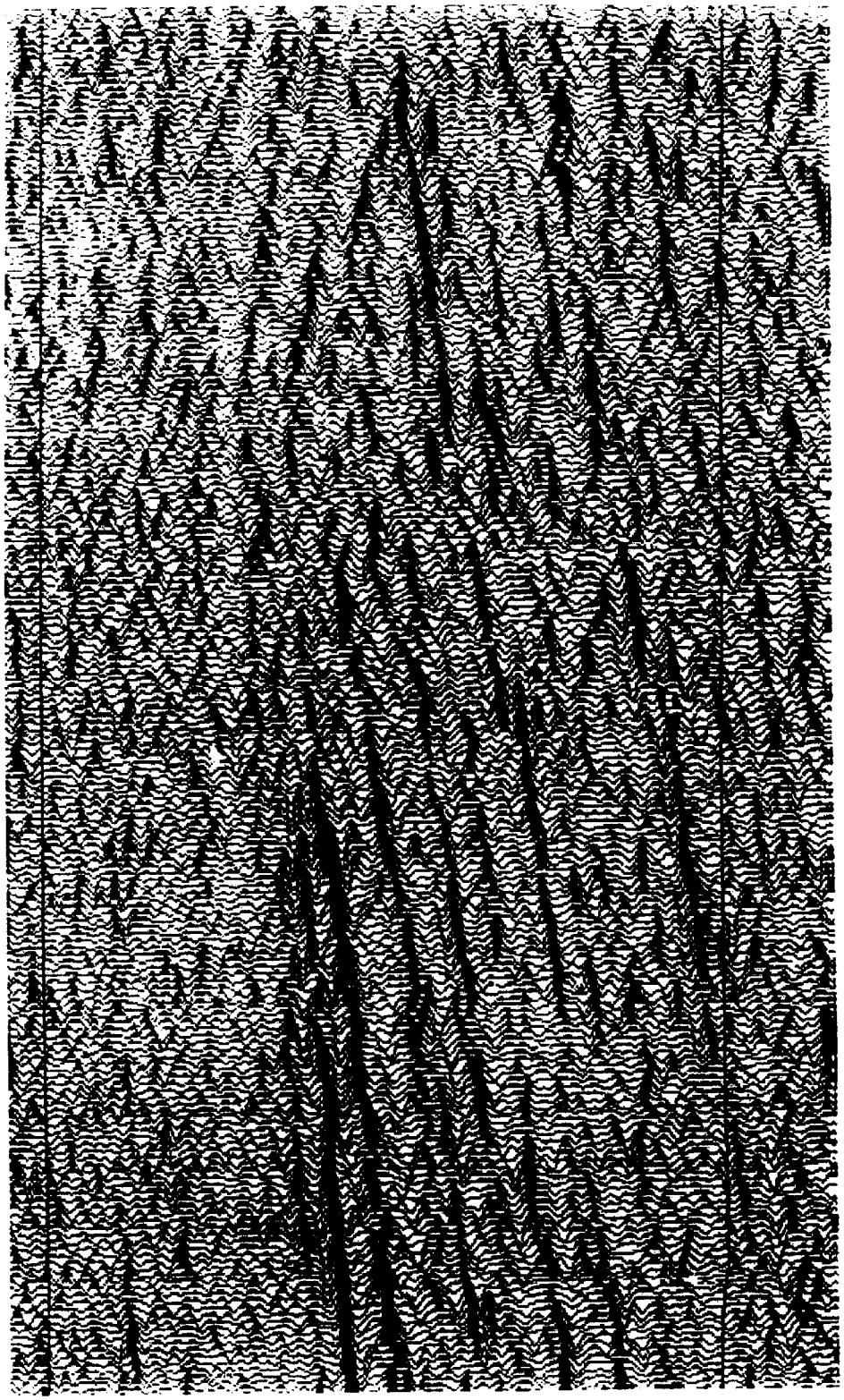
FIG. 13 is a vertical seismic section of the seismic data described in the Example, before any Receiver Signal Ghosts were artificially applied to the data set.
Figure 14:
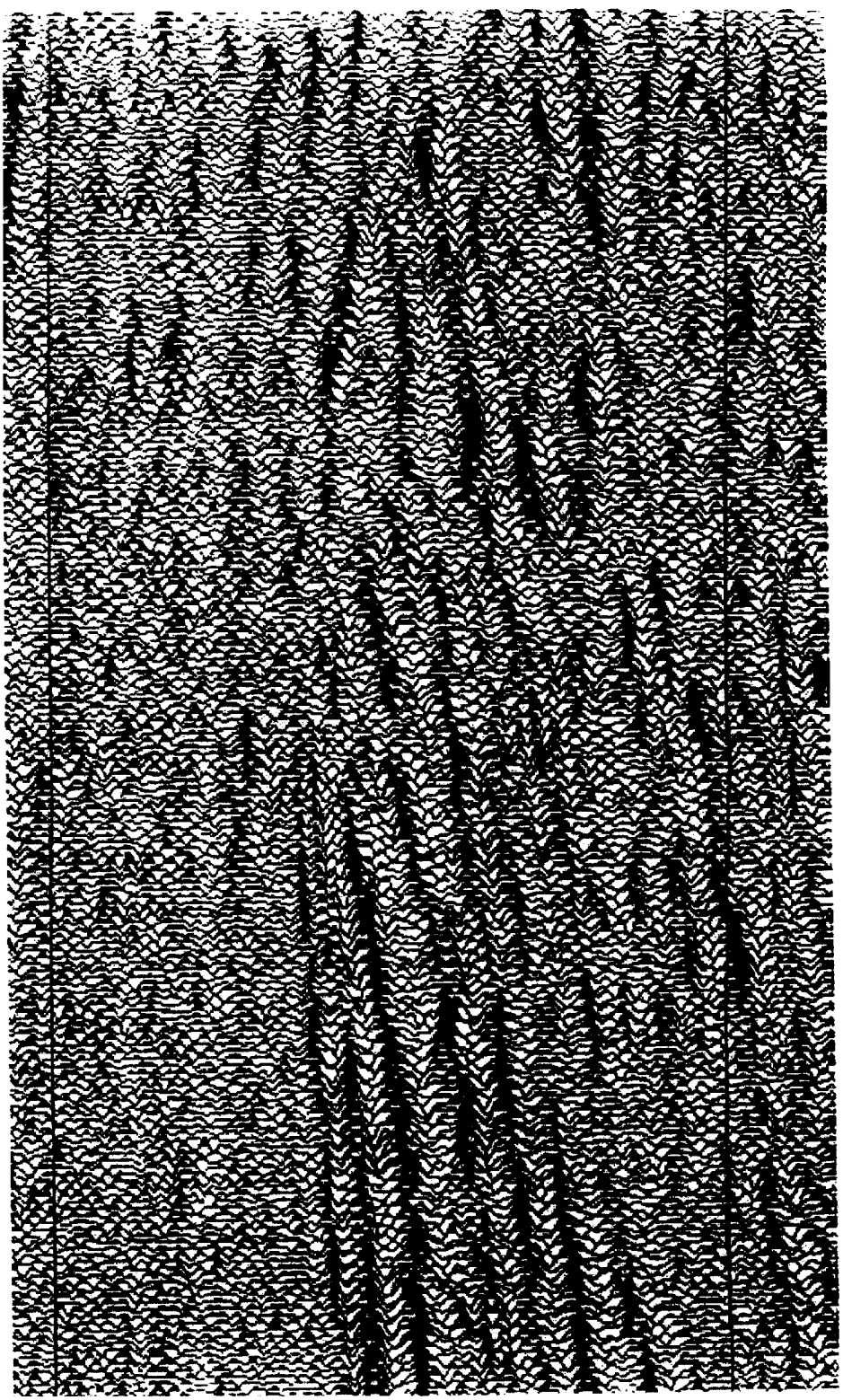
FIG. 14 is a vertical seismic section of the seismic data of FIG. 13, after Receiver Signal Ghosts were artificially applied to the data set.

FIG. 13 shows a gather based on common in-line position, where the data are sorted according to their position in the cross-line direction. The data of FIG. 13 are a conventionally acquired post-stack 3D marine seismic data set before the simulated Receiver Signal Ghosts were convolved onto the data set. This data set will be referred to as the "reference data set". FIG. 14 shows the same type of gather as FIG. 13, but with the simulated Receiver Signal Ghosts convolved onto the data. The effects of the simulated Receiver Signal Ghosts on the data set can be clearly seen.

Note that for ease of illustration, only every other hydrophone trace is shown in FIGS. 13, 14, 15, and 16.

Figure 10:
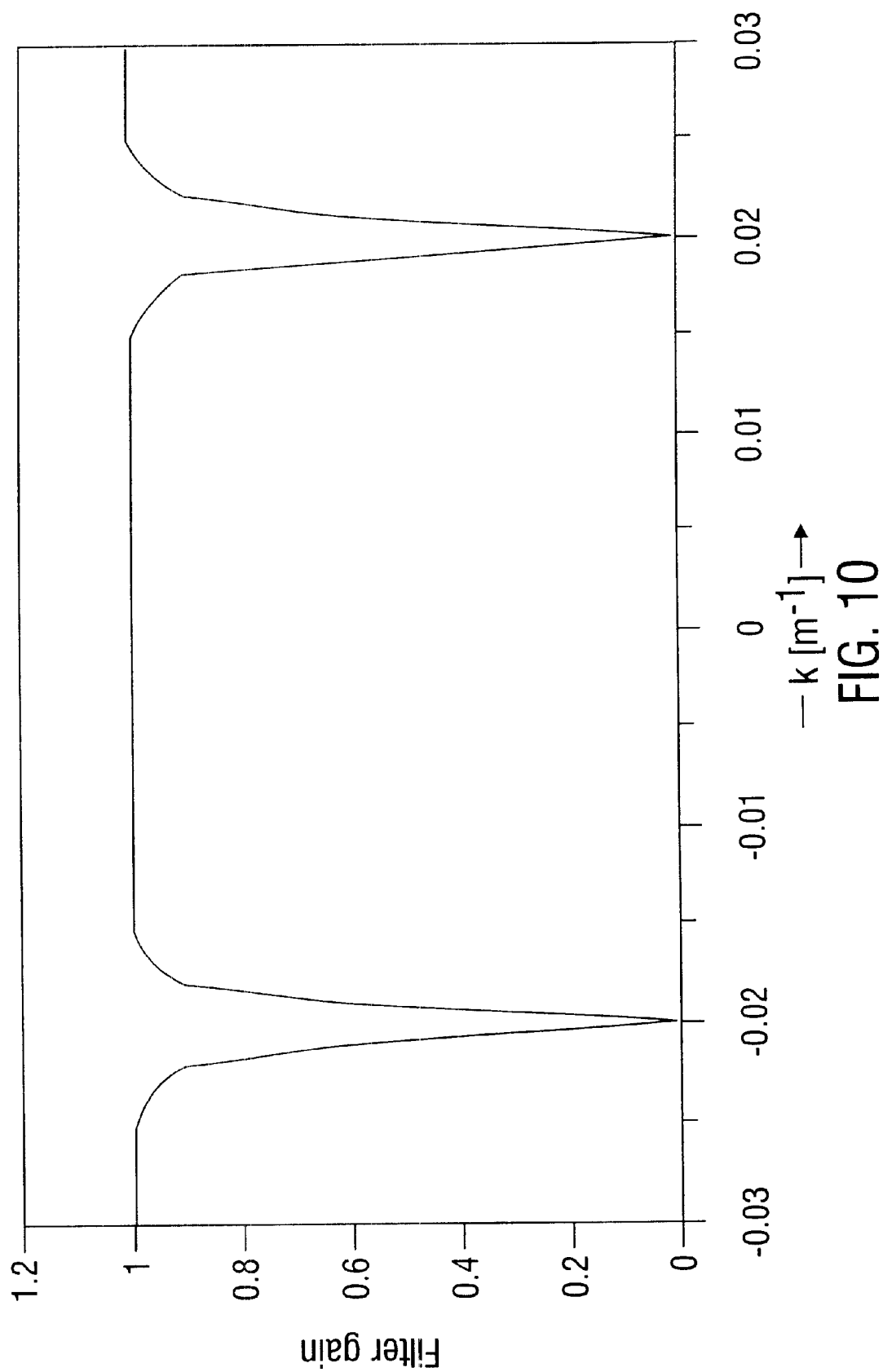
FIG. 10 is a diagram showing the response of a K-notch filter capable of being used in the current invention.

A k-notch filter, as shown in FIG. 10, was applied to the data set of FIG. 14. The data was resorted into the original ordering and then migrated using migration methods known to one of ordinary skill in the art. The result of these operations is shown in FIG. 15, which for consistency should be compared against the migrated reference data set shown in FIG. 16.

Figure 12:
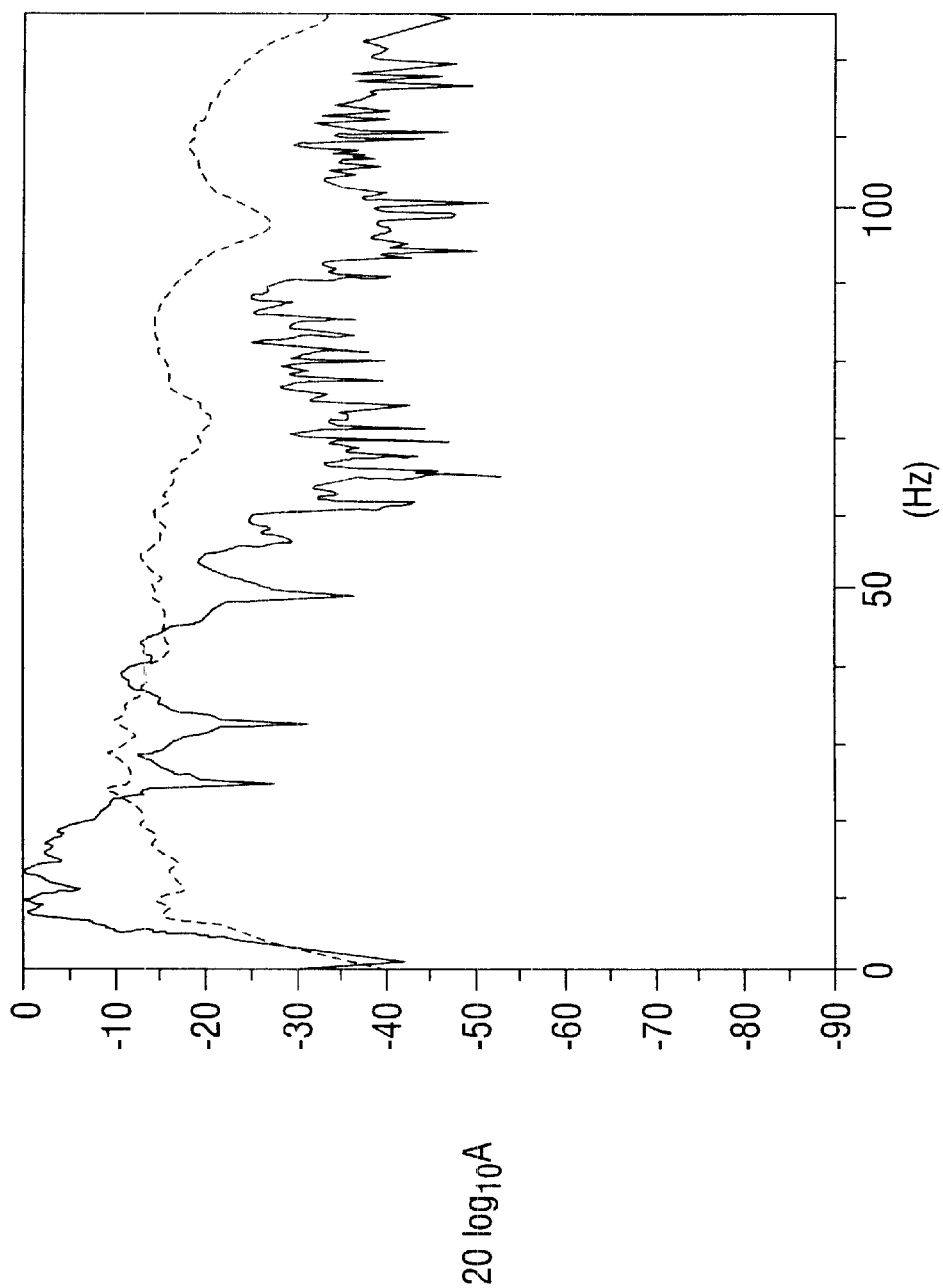
FIG. 12 is a plot of the amplitude spectrum of the seismic data of FIG. 17, after Receiver Signal Ghosts are artificially introduced into the data. The estimated signal is shown with a solid line, the estimated noise is shown with a dashed line.
Figure 17:
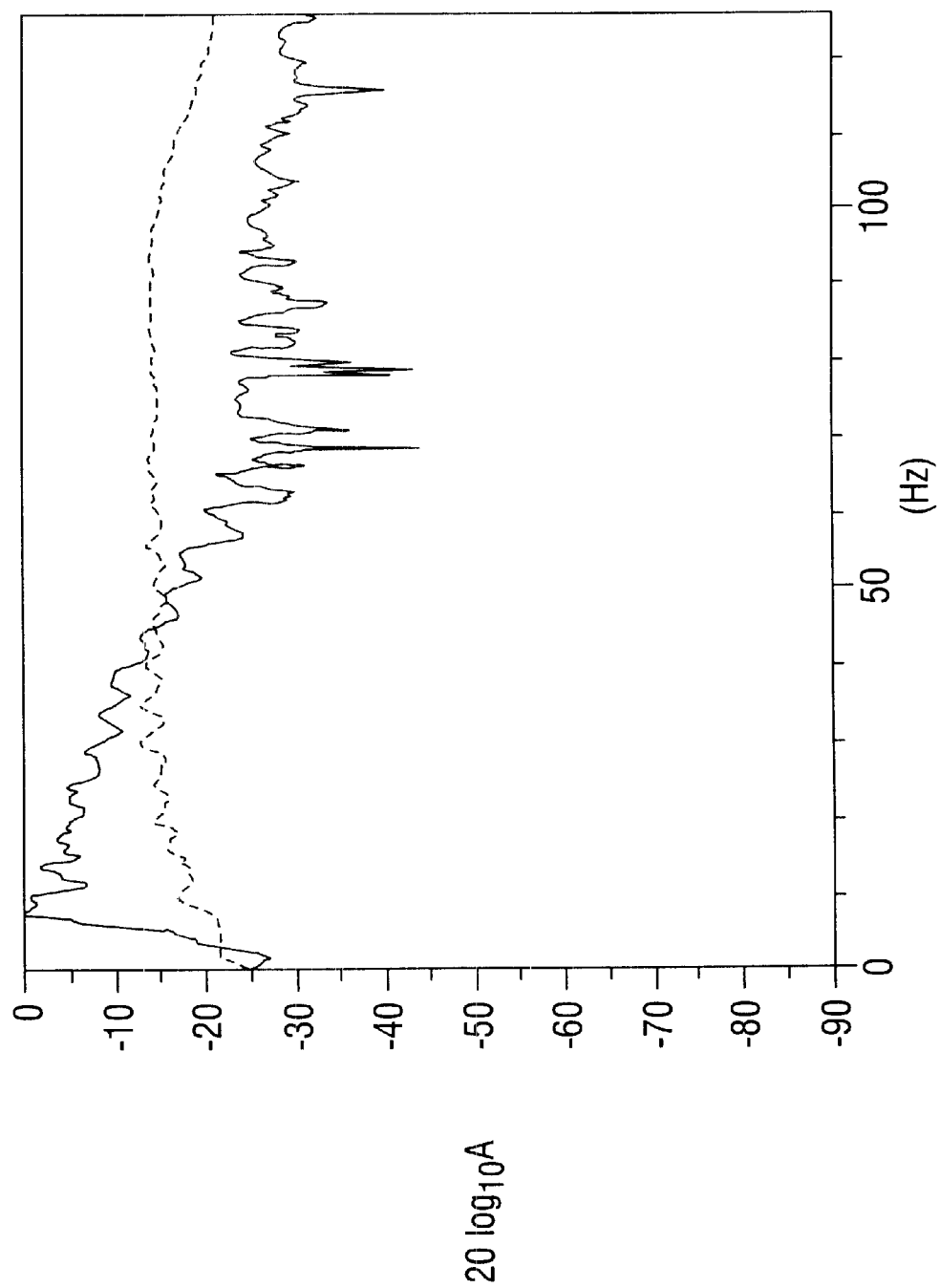
FIG. 17 is a plot of the amplitude spectrum of the seismic data described in the Example, before any Receiver Signal Ghosts are artificially introduced into the data. The estimated signal is shown with a solid line, the estimated noise is shown with a dashed line.
Figure 18:
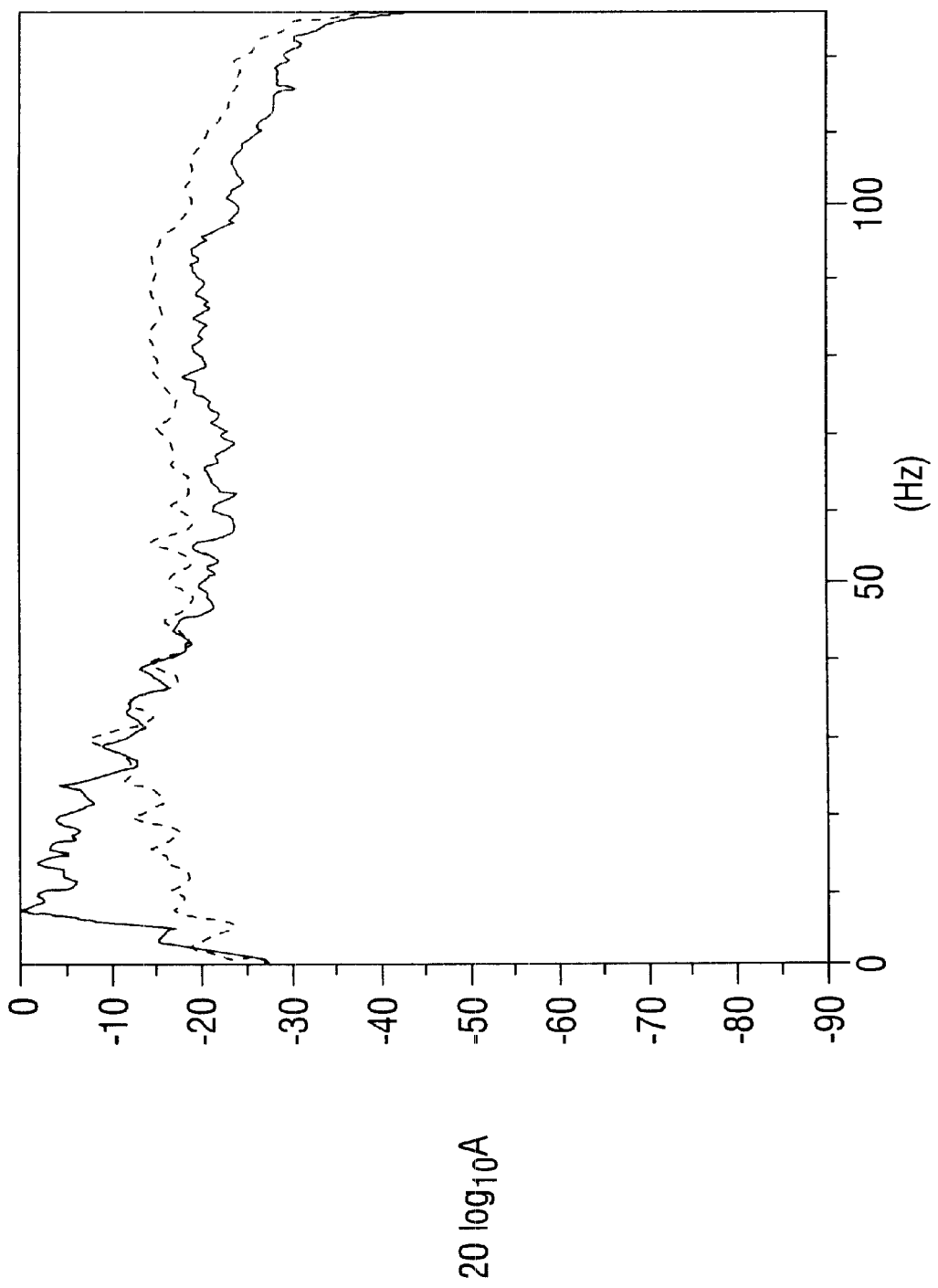
FIG. 18 is a plot of the amplitude spectrum of the seismic data of FIG. 14, after application of the k-notch filter and spectral shaping. The estimated signal is shown with a solid line, the estimated noise is shown with a dashed line.
Figure 19:
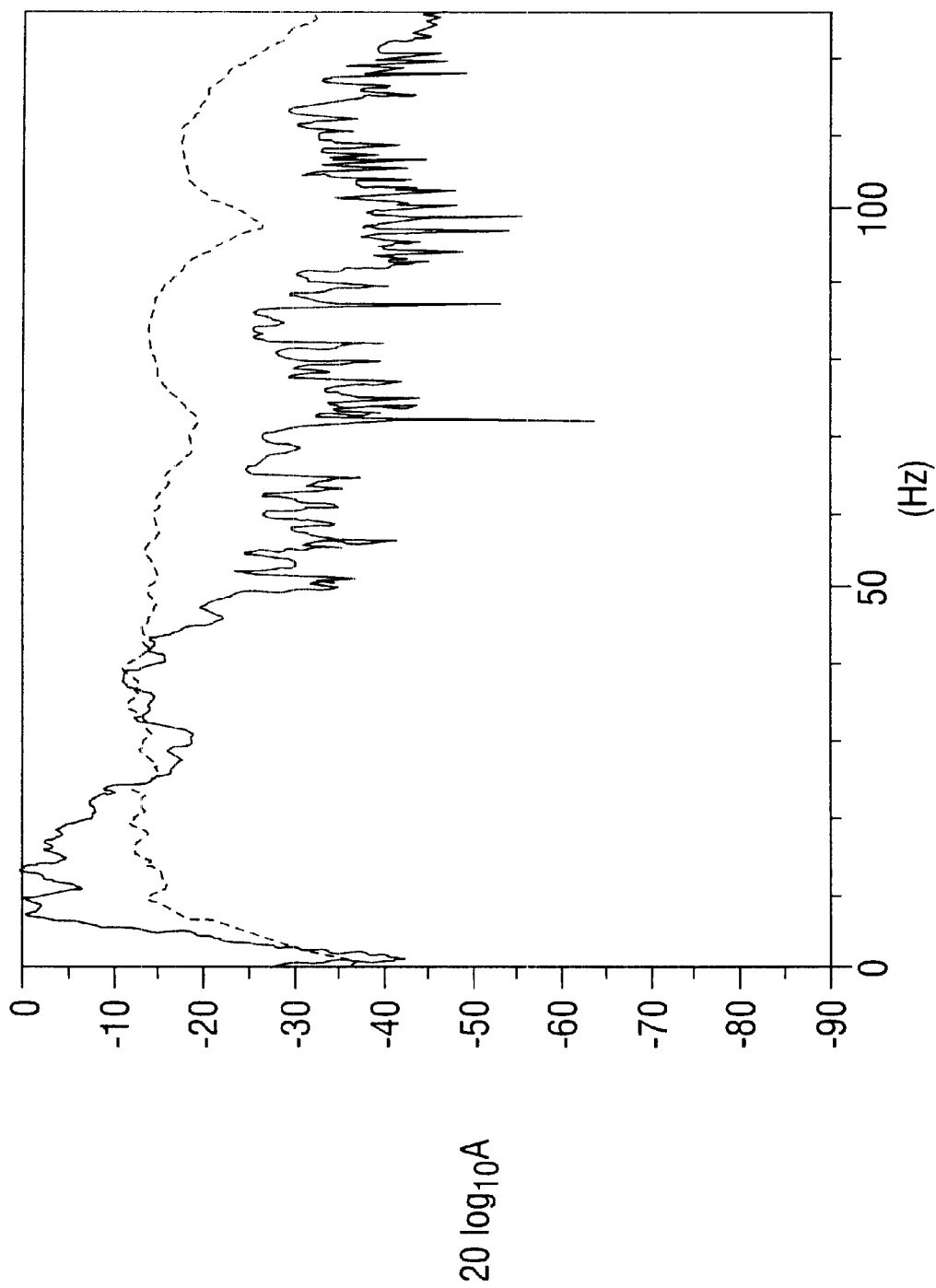
FIG. 19 is a plot of the amplitude spectrum of the seismic data of FIG. 14, after k-notch filtering, but before spectral shaping. The estimated signal is shown with a solid line, the estimated noise is shown with a dashed line.

It can be seen that the simulated Receiver Signal Ghosts were removed effectively by the processing methods of the current invention by comparing the frequency spectra plots of the reference data set, the semi-synthetic data set, and the data set resulting from the processing of the semi-synthetic data set in accordance with the processing methods of the current invention as shown in FIGS. 17, 12, and 18 respectively. At this stage it should be pointed out that the shape of the signal spectrum of FIG. 18 has been altered not only by the introduction of ghosts and the k-notch filtering, but it has also been shaped to match the shape of the signal spectrum of FIG. 17 between 0 and 50 Hz. It should be noted here that the combined processes acting upon the signal spectrum as shown in FIG. 17 have rendered the signal relatively unaltered (between 0 and 50 Hz) but increased the noise levels, as shown by the dashed line in FIG. 18, near the notch frequencies, approximately in the range from 20–35 Hz. For reference, the signal spectrum after k-notch filtering, but prior to spectral shaping is shown in FIG. 19.

Figure 15:
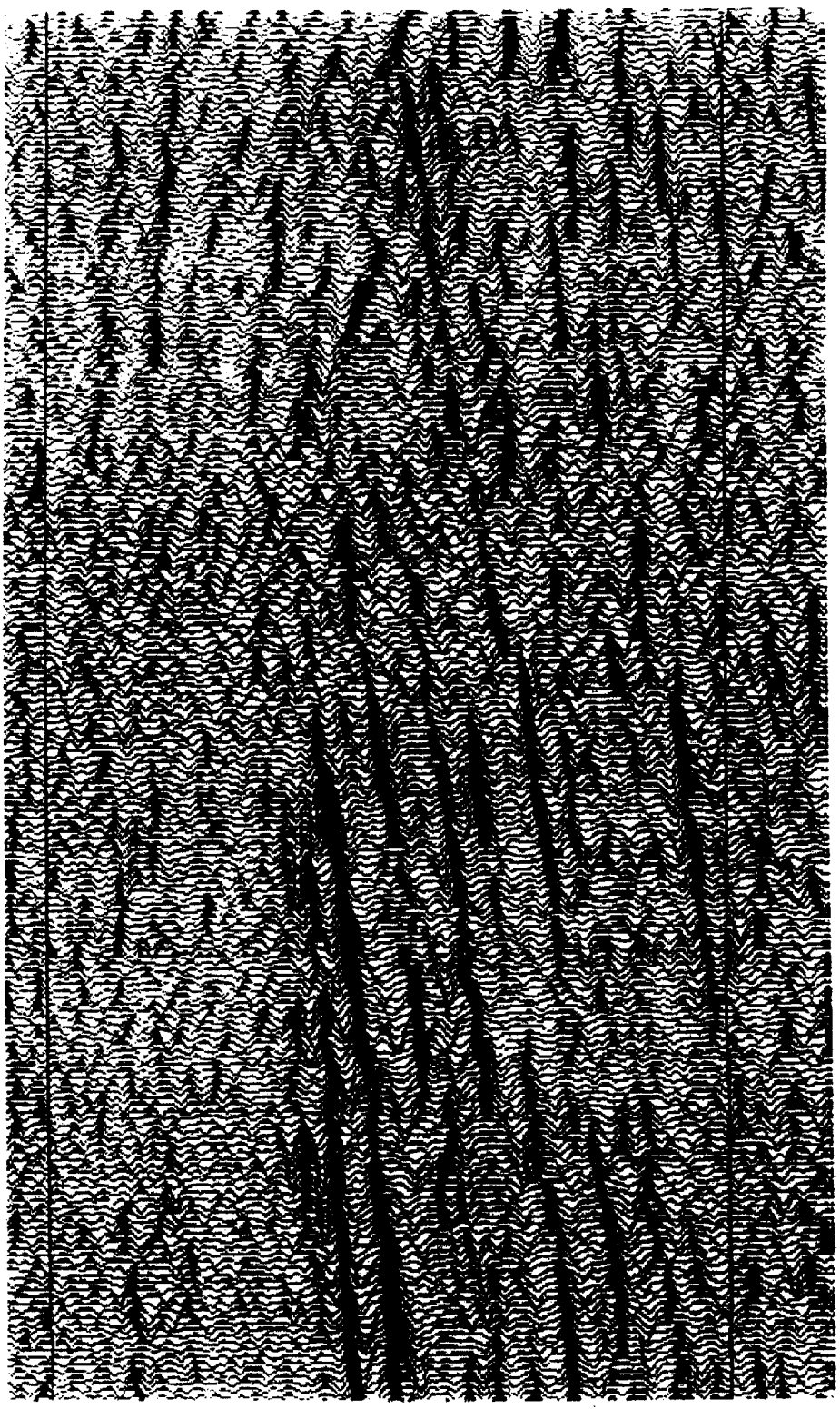
FIG. 15 is a vertical seismic section of the seismic data of FIG. 14, after application of a k-notch filter, spectral shaping and migration.
Figure 16:
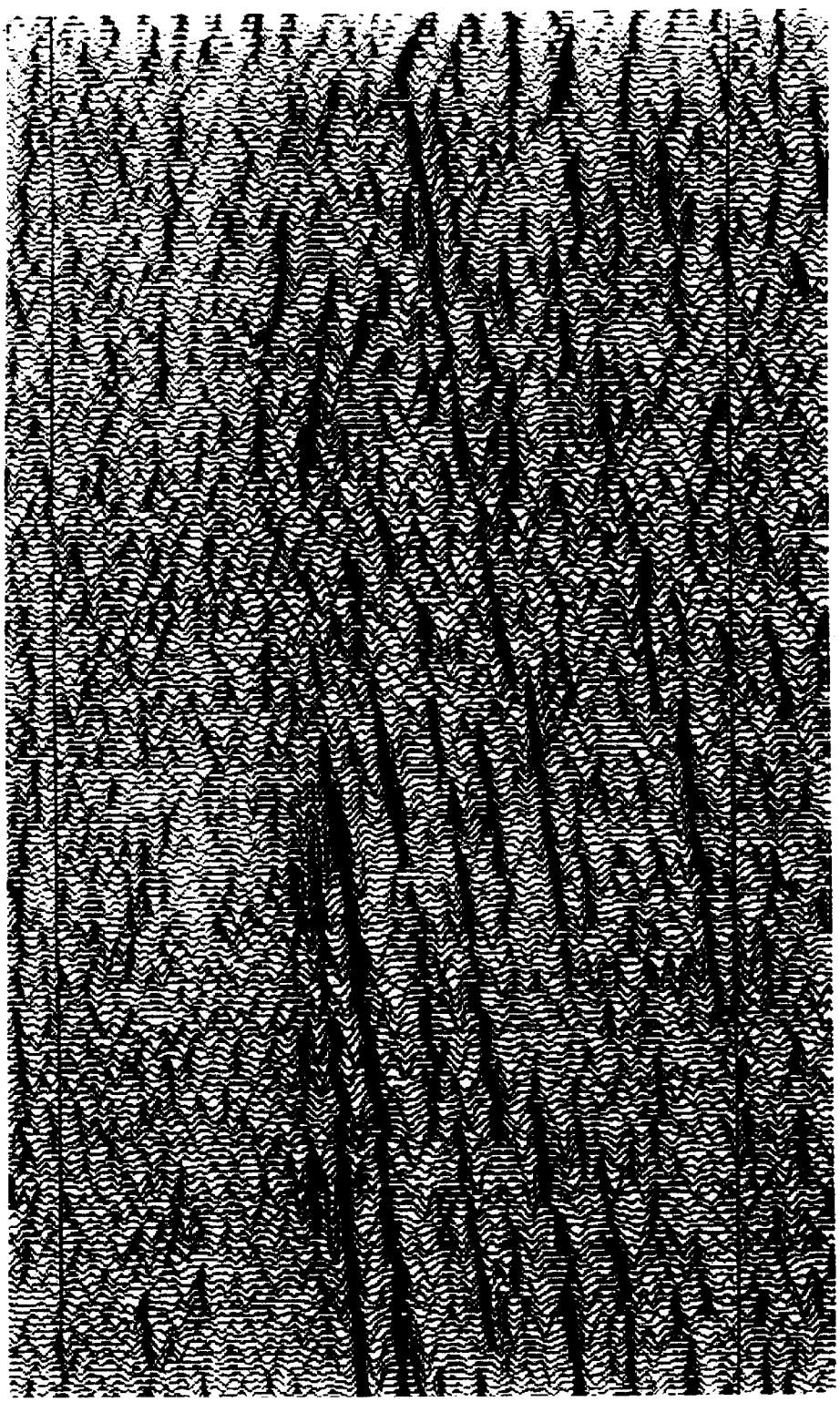
FIG. 16 is a vertical seismic section of the seismic data of FIG. 13, after migration, which serves as a reference for the processed result of FIG. 15.

From comparing FIG. 17 with FIG. 18, and comparing FIG. 15 with FIG. 16 it can be clearly seen that the simulated Receiver Signal Ghosts introduced (and observed in FIGS. 12 and 14) have been removed from the data set resulting from the processing according to the current invention.

From the foregoing detailed description of a specific embodiment of the invention, it should be apparent that a method and apparatus for geophysical exploration has been disclosed. Although a specific embodiment of the invention has been disclosed herein in some detail, this has been done solely for the purposes of illustrating various aspects and features of the invention, and is not intended to be limiting with respect to the scope of the invention. It is contemplated that various substitutions, alterations, and/or modifications, including but not limited to those design alternatives which might have been specifically noted in this disclosure, may be made to the disclosed embodiment without departing from the spirit and scope of the invention as defined in the appended claims.

What is claimed is:

1. A method for acquiring a seismic data set, the seismic data set being capable of providing information regarding the strata which underlies the body of water where the seismic data set is acquired, the method comprising the steps of:

towing a quasi over-under array having streamers, wherein adjacent said streamers are offset latterly and offset vertically from one another;

acquiring seismic data exhibiting a repetitive pattern in a cross-line direction as a function of a variation of said streamer depth;

placing said seismic data into gathers based on common offset and common in-line position;

sorting said gathers according to said data's cross-line position;

filtering the seismic data using a filter that removes the larger part of a cross-line trace to trace variation caused by different delays between receiver signal ghosts pertaining to said traces; and removing said filtered data from said gathers for further seismic processing.

2. The method of claim 1, wherein the sequence of said streamers across a survey, viewed in the cross-line direction, form a repeating V-pattern.

3. The method of claim 1, wherein the sequence of said streamers across a survey, viewed in the cross-line direction, form a repeating W-pattern.

4. The method of claim 1, wherein said step of acquiring seismic data utilizes a vertically stacked source array.

5. A method for acquiring a seismic data set, the seismic data set being capable of providing information regarding the strata which underlies the body of water where the seismic data set is acquired, the method comprising the step of:

towing a quasi over-under array having streamers, wherein adjacent said streamers are offset latterly and offset vertically from one another;

acquiring seismic data exhibiting a repetitive pattern in a cross-line direction as a function of a variation of said streamer depth;

placing said seismic data into gathers based on common in-line position;

sorting said gathers according to said data's cross-line position;

filtering the seismic data using a filter that removes the larger part of a cross-line trace to trace variation caused by different delays between receiver signal ghosts pertaining to said traces; and removing said filtered data from said gathers for further seismic processing.

6. The method of claim 5, wherein the sequence of said streamers across a survey, viewed in the cross-line direction, form a repeating V-pattern.

7. The method of claim 5, wherein the sequence of said streamers across a survey, viewed in the cross-line direction, form a repeating W-pattern.

8. The method of claim 5, wherein said step of acquiring seismic data utilizes a vertically stacked source array.

9. A method for acquiring a seismic data set, the seismic data set being capable of providing information regarding the strata which underlies the body of water where the seismic data set is acquired, the method comprising the steps of:

towing a quasi over-under array having streamers, wherein the sequence of said streamers across a survey, viewed in the cross-line direction, form a repeating V-pattern;

acquiring seismic data exhibiting a repetitive pattern in a cross-line direction as a function of a variation of said streamer depth;

placing said seismic data into gathers based on common offset and common in-line position;

sorting said gathers according to said data's cross-line position;

filtering the seismic data using a filter that removes the larger part of a cross-line trace to trace variation caused by different delays between receiver signal ghosts pertaining to said traces; and removing said filtered data from said gathers for further seismic processing.

10. The method of claim 9, wherein said step of acquiring seismic data utilizes a vertically stacked source array.

11. A method for acquiring a seismic data set, the seismic data set being capable of providing information regarding the strata which underlies the body of water where the seismic data set is acquired, the method comprising the steps of:

towing a quasi over-under array having streamers, wherein the sequence of said streamers across a survey, viewed in the cross-line direction, form a repeating V-pattern;

acquiring seismic data exhibiting a repetitive pattern in a cross-line direction as a function of a variation of said streamer depth;

placing said seismic data into gathers based on common in-line position;

sorting said gathers according to said data's cross-line position;

filtering the seismic data using a filter that removes the larger part of a cross-line trace to trace variation caused by different delays between receiver signal ghosts pertaining to said traces; and removing said filtered data from said gathers for further seismic processing.

12. The method of claim 11, wherein said step of acquiring seismic data utilizes a vertically stacked source array.

* * * * *